(12) United States Patent
Nakajima

(10) Patent No.: US 10,404,937 B2
(45) Date of Patent: Sep. 3, 2019

(54) COMMUNICATION DEVICE AND COMMUNICATION METHOD

(71) Applicant: SONY CORPORATION, Tokyo (JP)

(72) Inventor: Yasuhisa Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 3 days.

(21) Appl. No.: 15/308,869

(22) PCT Filed: Feb. 13, 2015

(86) PCT No.: PCT/JP2015/054037
§ 371 (c)(1),
(2) Date: Nov. 4, 2016

(87) PCT Pub. No.: WO2015/174108
PCT Pub. Date: Nov. 19, 2015

(65) Prior Publication Data
US 2017/0070701 A1    Mar. 9, 2017

(30) Foreign Application Priority Data

May 15, 2014    (JP) .................................. 2014-101704

(51) Int. Cl.
*H04N 7/173*    (2011.01)
*H04N 7/081*    (2006.01)
(Continued)

(52) U.S. Cl.
CPC ............. *H04N 7/081* (2013.01); *G09G 5/006* (2013.01); *H04N 19/98* (2014.11);
(Continued)

(58) Field of Classification Search
CPC combination set(s) only.
See application file for complete search history.

(56) References Cited

U.S. PATENT DOCUMENTS 5,745,173 A * 4/1998 Edwards ............ H04N 5/23248
348/143
6,118,820 A * 9/2000 Reitmeier ............ H04N 19/103
375/240.16

(Continued)

FOREIGN PATENT DOCUMENTS

| JP | 2006-211095 A | 8/2006 |
| JP | 2008-276067 A | 11/2008 |
| JP | 2009-003882 A | 1/2009 |

*Primary Examiner* — William J Kim
(74) *Attorney, Agent, or Firm* — Chip Law Group

(57) ABSTRACT

HDMI transmission of uncompressed image data, on which dynamic range processing is performed, is performed from an HDMI source device and a display in appropriate luminance is performed in an HDMI sink device.
When HDMI input switching is performed, a television receiver 13 transmits transmission request information to an HDMI source device in a destination of the input switching and acquires dynamic range conversion definition information of uncompressed image data at intended timing. Also, when it is possible to acquire the dynamic range conversion definition information of the uncompressed image data, the television receiver 13 minimizes transmission of the dynamic range conversion definition information from a BD recorder 11 by sending reception recognition information back.

14 Claims, 21 Drawing Sheets

(51) Int. Cl.
*H04N 21/436* (2011.01)
*H04N 21/4402* (2011.01)
*G09G 5/00* (2006.01)
*H04N 19/98* (2014.01)

(52) U.S. Cl.
CPC ....... *H04N 21/436* (2013.01); *H04N 21/4402* (2013.01); *G09G 2340/02* (2013.01); *G09G 2360/128* (2013.01); *G09G 2370/047* (2013.01); *G09G 2370/06* (2013.01); *G09G 2370/12* (2013.01)

(56) References Cited

U.S. PATENT DOCUMENTS

| | | | | |
|---|---|---|---|---|
| 6,795,053 B1 * | 9/2004 | Funamoto | ............ | G09G 3/3406 345/102 |
| 8,175,158 B2 * | 5/2012 | Segall | ................... | H04N 19/30 375/240.14 |
| 9,661,294 B2 * | 5/2017 | Oh | ....................... | H04N 9/8722 |
| 2009/0067506 A1 * | 3/2009 | Doser | ................... | H04N 19/176 375/240.18 |
| 2009/0317059 A1 * | 12/2009 | Chen | ........................ | H04N 5/76 386/241 |
| 2010/0039504 A1 * | 2/2010 | Takahashi | .......... | G02B 27/0025 348/54 |
| 2010/0085482 A1 * | 4/2010 | Toba | ...................... | G09G 5/006 348/554 |
| 2010/0208143 A1 * | 8/2010 | Banterle | ................. | G06T 5/008 348/678 |
| 2012/0229526 A1 * | 9/2012 | Holmes | ..................... | G06F 3/14 345/690 |
| 2014/0125696 A1 * | 5/2014 | Newton | ................. | H04N 5/235 345/629 |
| 2014/0210847 A1 * | 7/2014 | Knibbeler | .............. | G09G 5/006 345/589 |
| 2015/0262323 A1 * | 9/2015 | Sartor | ................ | H04N 21/2343 345/422 |
| 2015/0341611 A1 * | 11/2015 | Oh | ....................... | H04N 9/8722 386/230 |

* cited by examiner

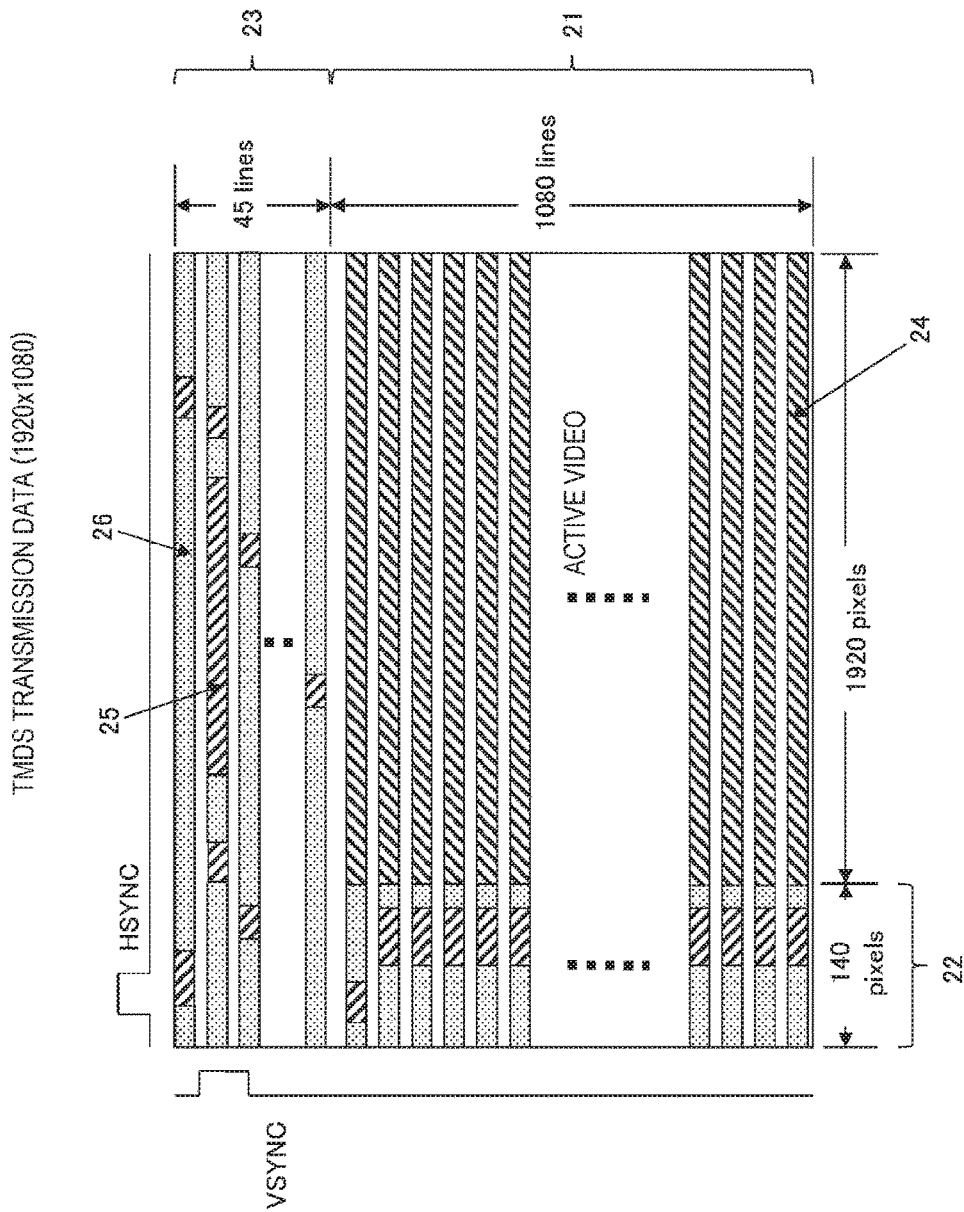

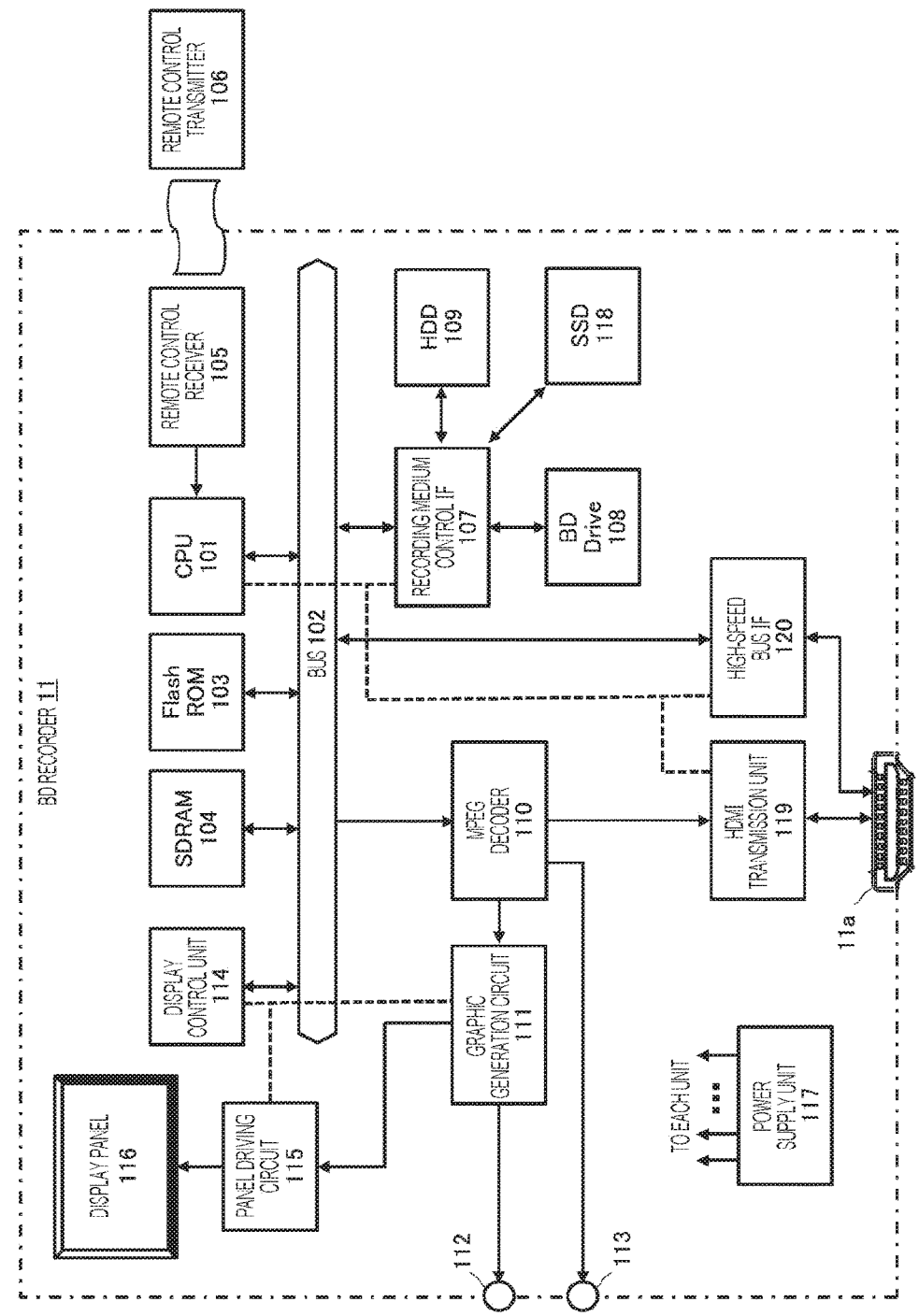

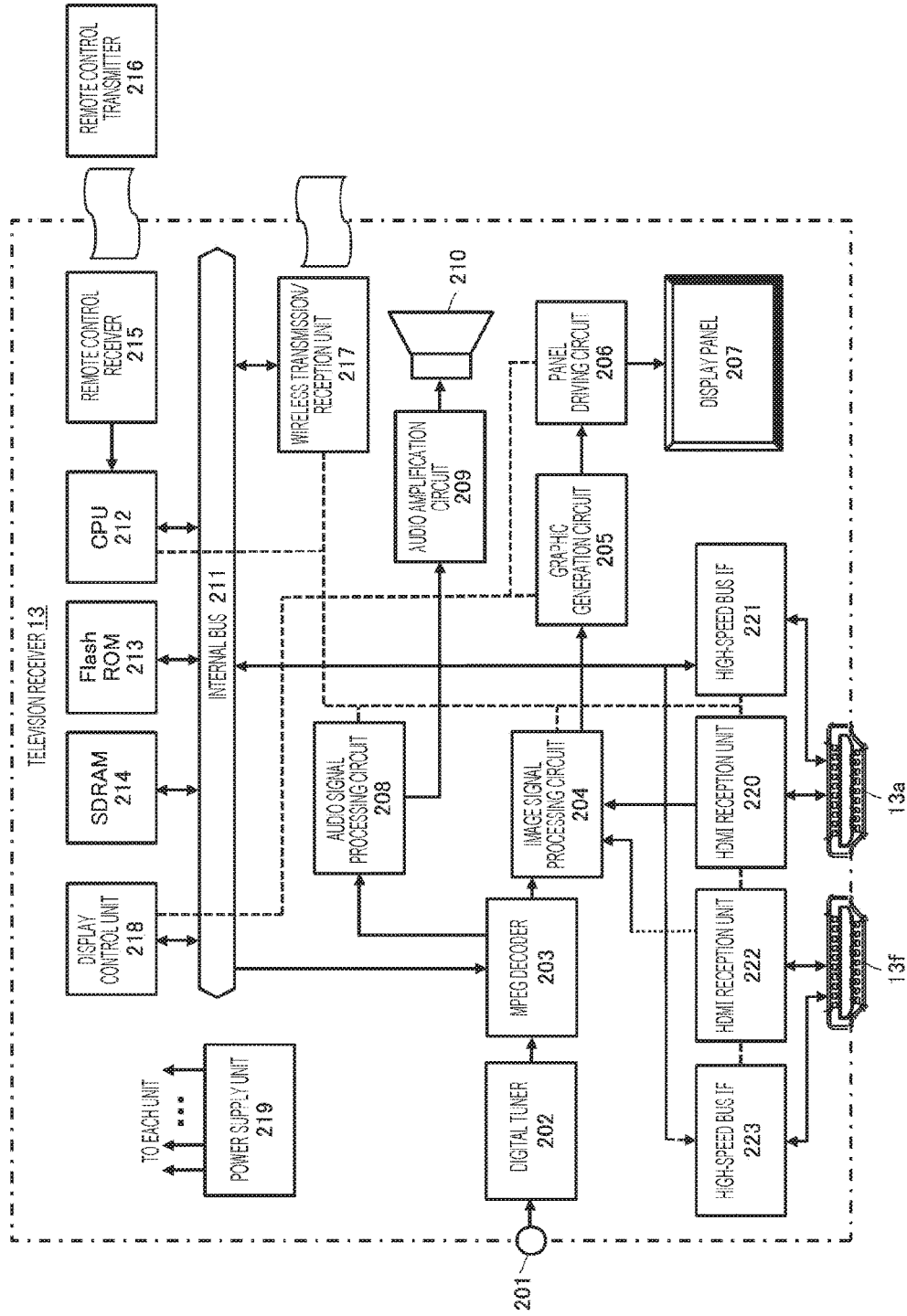

FIG. 6

| knee_function_info(payloadSize){ | Descriptor |
|---|---|
| 601 — knee_function_id | ue(v) |
| 602 — knee_function_cancel_flag | u(1) |
| if(!knee_function_cancel_flag){ | |
| 603 — knee_function_persistence_flag | u(1) |
| 604 — mapping_flag | u(1) |
| 605 — input_d_range | u(32) |
| 606 — input_disp_luminance | u(32) |
| 607 — output_d_range | u(32) |
| 608 — output_disp_luminance | u(32) |
| 609 — num_knee_points_minus1 | ue(v) |
| 610 — for(i=0; i<=num_knee_points_minus1; i++){ | |
| 611 —   input_knee_point[i] | u(10) |
| 612 —   output_knee_point[i] | u(10) |
| } | |
| } | |
| } | | knee_function_info SEI 200

COMMUNICATION DEVICE AND COMMUNICATION METHOD

CROSS REFERENCE TO RELATED APPLICATIONS

This application is a U.S. National Phase of International Patent Application No. PCT/JP2015/054037 filed on Feb. 13, 2015, which claims priority benefit of Japanese Patent Application No. JP 2014-101704 filed in the Japan Patent Office on May 15, 2014. The above-referenced applications is hereby incorporated herein by reference in its entirety.

TECHNICAL FIELD

A technology disclosed in the present specification relates to a communication device, a communication method, and a computer program to transmit/receive data and relates, for example, to a communication device, a communication method, and a computer program to transmit/receive uncompressed image data transmitted by a digital interface such as an HDMI.

BACKGROUND ART

Recently, a high definition multimedia interface (HDMI) (registered trademark) is becoming popular as a communication interface to transmit an uncompressed (baseband) image signal (image data) and a digital audio signal (audio data) associated with the image signal at high speed. A data transmission side connected through an HDMI interface is an HDMI source device and a data reception side is an HDMI sink device. For example, an AV system in which a Blu-ray Disc (BD) recorder, a set top box (STB), or a different audio visual source (AV source) as the HDMI source device, and a television receiver, a projector, or a different display as the HDMI sink device are connected to each other by the HDMI interface is considered.

For example, an HDMI sink device that includes a plurality of HDMI inputs and that has an input source switching function according to operation of a user is known (see, for example, Patent Documents 1 and 2). The HDMI source device detects a hot plug signal of an HDMI terminal and controls an output of an image audio signal in order to detect an HDMI input switched by a user.

There is a case where uncompressed image data output from the HDMI source device is transmitted after dynamic range conversion with respect to an original image having a dynamic range equal to or higher than standard luminance and compression into a dynamic range of standard luminance.

Also, recently, with progress in a display technology, a display device such as an organic electro-luminescence (organic) display or a liquid crystal display (LCD) that can display an image that is, for example, around 1000 cd/m$^2$ and is brighter than standard luminance is commercially supplied. In a case where an HDMI sink device is a display device having such a wide dynamic range, dynamic range inverse conversion is performed with respect to image data, on which dynamic range conversion into standard luminance is once performed, and image data having an original high-luminance dynamic range is restored, whereby an image display making use of configuration capability thereof becomes possible.

However, when HDMI input switching is performed in an HDMI sink device and in a case where dynamic range conversion definition information of uncompressed image data varies in an HDMI source device before and after the switching, the HDMI sink device may perform dynamic range inverse conversion of the uncompressed image data on the basis of different dynamic range conversion definition information and may perform conversion into an image in a dynamic range different from an intended dynamic range.

SUMMARY OF THE INVENTION

Problems to be Solved by the Invention

A purpose of a technology disclosed in the present specification is to provide a superior communication device, communication method, and computer program with which it is possible to suitably transmit/receive uncompressed image data, on which dynamic range processing is performed, through a digital interface such as an HDMI.

A purpose of a technology disclosed in the present specification is to provide a superior communication device, communication method, and computer program with which it is possible to transmit uncompressed image data, on which dynamic range processing is performed, through a digital interface such as an HDMI and to perform a display in appropriate luminance in an HDMI sink device.

Solutions to Problems

The present application is provided in view of the forgoing problems. A technology described in claim 1 is a communication device including: a data transmission unit that transmits uncompressed image data to an external device through a transmission path; an information transmission unit that transmits dynamic range conversion definition information of the uncompressed image data to the external device through the transmission path; and a control reception unit that receives transmission control information of the dynamic range conversion definition information from the external device through the transmission path.

According to a technology described in claim 2 of the present application, the control reception unit of the communication device according to claim 1 is configured to receive the transmission control information from the external device through a line that receives notification of a connection state of the external device with DC bias potential of the transmission path.

According to a technology described in claim 3 of the present application, the control reception unit of the communication device according to claim 1 is configured to receive the transmission control information from the external device through a predetermined control data line included in the transmission path.

According to a technology described in claim 4 of the present application, the control reception unit of the communication device according to claim 1 is configured to receive the transmission control information from the external device through a bi-directional communication path including a predetermined line included in the transmission path.

According to a technology described in claim 5 of the present application, the communication device according to any one of claim 1 to claim 4 is configured to control transmission of the dynamic range conversion definition information from the information transmission unit to the external device on the basis of the transmission control information received in the control reception unit from the external device.

Also, a technology according to claim 6 of the present application is a communication method including: a data transmitting step of transmitting uncompressed image data to an external device through a transmission path; an information transmitting step of transmitting dynamic range conversion definition information of the uncompressed image data to the external device through the transmission path; a control receiving step of receiving transmission control information of the dynamic range conversion definition information from the external device through the transmission path; and a transmission controlling step of controlling transmission of the dynamic range conversion definition information to the external device on the basis of the transmission control information received from the external device in the control receiving step.

Also, a technology according to claim 7 of the present application is a computer program in a computer-readable format which program causes a computer to function as a data transmission unit that transmits uncompressed image data to an external device through a transmission path, an information transmission unit that transmits dynamic range conversion definition information of the uncompressed image data to the external device through the transmission path, and a control reception unit that receives transmission control information of the dynamic range conversion definition information from the external device through the transmission path.

The computer program according to claim 7 of the present application is what defines a computer program described in a computer-readable format in such a manner that predetermined processing is realized on the computer. In other words, by installation of the computer program according to claim 7 of the present application into the computer, a cooperative action is exerted on the computer and it is possible to acquire an effect similar to that of the communication device according to claim 1 of the present application.

Also, a technology according to claim 8 of the present application is a communication device including: a data reception unit that receives uncompressed image data from an external device through a transmission path; an information reception unit that receives dynamic range conversion definition information of the uncompressed image data from the external device through the transmission path; and a control transmission unit that transmits transmission control information of the dynamic range conversion definition information to the external device through the transmission path.

According to a technology described in claim 9 of the present application, the control transmission unit of the communication device according to claim 8 is configured to transmit the transmission control information to the external device through a line that receives notification of a connection state of the external device with DC bias potential of the transmission path.

According to a technology described in claim 10 of the present application, the control transmission unit of the communication device according to claim 8 is configured to transmit the transmission control information to the external device through a predetermined control data line included in the transmission path.

According to a technology described in claim 11 of the present application, the control transmission unit of the communication device according to claim 8 is configured to transmit the transmission control information to the external device through a bi-directional communication path including a predetermined line included in the transmission path.

Also, a technology according to claim 12 of the present application is a communication device including: a data receiving step of receiving uncompressed image data from an external device through a transmission path; an information receiving step of receiving dynamic range conversion definition information of the uncompressed image data from the external device through the transmission path; and a control transmitting step of transmitting transmission control information of the dynamic range conversion definition information to the external device through the transmission path.

Also, a technology according to claim 13 of the present application is a computer program in a computer readable format which program causes a computer to function as a data reception unit that receives uncompressed image data from an external device through a transmission path, an information reception unit that receives dynamic range conversion definition information of the uncompressed image data from the external device through the transmission path, and a control transmission unit that transmits transmission control information of the dynamic range conversion definition information to the external device through the transmission path.

The computer program according to claim 13 of the present application is what defines a computer program described in a computer-readable format in such a manner that predetermined processing is realized on the computer. In other words, by installation of the computer program according to a claim of the present application 13 into the computer, a cooperative action is exerted on the computer and it is possible to acquire an effect similar to that of the communication device according to claim 8 of the present application.

Effects of the Invention

According to a technology disclosed in the present specification, it is possible to provide a superior communication device, communication method, and computer program with which it is possible to transmit uncompressed image data, on which dynamic range processing is performed, through a digital interface such as an HDMI and to perform a display in appropriate luminance in an HDMI sink device.

Note that the effect described in the present specification is just an example and an effect of the present invention is not limited to this. Also, the present invention may have an additional effect other than the above-described effects.

A different purpose, characteristic, and advantage of a technology disclosed in the present specification will be made clear with a detailed description based on an embodiment described later or on attached drawings.

BRIEF DESCRIPTION OF DRAWINGS

FIG. 3 is a view illustrating periods of various kinds of TDMS transmission data in a case where image data with a side×a length being 1920 pixels×1080 lines is transmitted in TDMS channels #0, #1, and #2.

FIG. 4 is a view illustrating a configuration example of the BD recorder 11.

FIG. 5 is a view illustrating a configuration example of the television receiver 13.

FIG. 6 is a view illustrating a syntax example of dynamic range conversion definition information "knee_function_info SEI."

MODE FOR CARRYING OUT THE INVENTION

In the following, an embodiment of a technology disclosed in the present specification will be described in detail with reference to the drawings.

[System Configuration Example]

Figure 1:
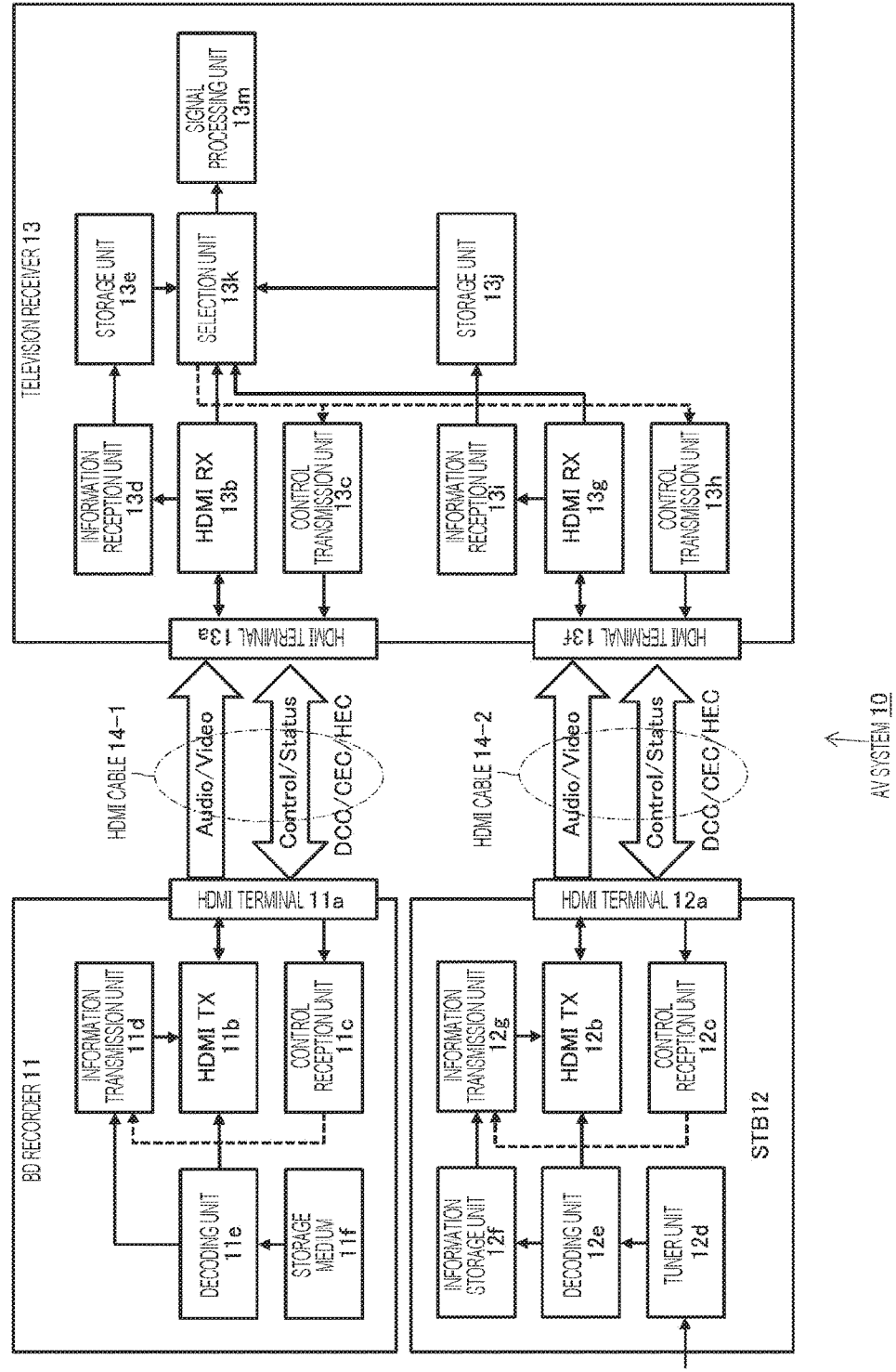
FIG. 1 is a view illustrating a functional configuration example of an audio visual (AV) system 10 to which a technology disclosed in the present specification is applied.

In FIG. 1, a functional configuration example of an audio visual (AV) system. 10 to which a technology disclosed in the present specification is applied is illustrated. The illustrated AV system 10 includes a Blu-ray Disc (BD) recorder 11 and a set top box (STB) 12 as HDMI source devices and a television receiver 13 as an HDMI sink device. The BD recorder 11 and the television receiver 13 are connected to each other through an HDMI cable 14-1 as a transmission path. Also, the STB 12 and the television receiver 13 are connected to each other through an HDMI cable 14-2 as a transmission path.

The BD recorder 11 includes a decoding unit 11e that reads coded data from a storage medium 11f and that performs decoding into an uncompressed image, an information transmission unit 11d that acquires conversion definition information of a high dynamic range image from the data decoded in the decoding unit 11e and that performs transmission to the television receiver 13 through the HDMI cable 14-1, an HDMI transmission unit (HDMI TX) 11b that transmits the data decoded in the decoding unit 11e to the television receiver 13 through the HDMI cable 14-1, a control reception unit 11c that receives transmission control information from the television receiver 13, and an HDMI terminal 11a to which the HDMI transmission unit 11b and the control reception unit 11c are connected. There is a case where a function of the control reception unit 11c is embedded in the HDMI transmission unit 11b or realized by utilization of a high-speed bus interface (described later).

For example, the information transmission unit 11d inserts dynamic range conversion definition information into a blanking period (described later) of uncompressed image data transmitted from the HDMI transmission unit 11b or transmits a packet, which stores dynamic range conversion definition information, by using a bi-directional communication path (described later) including a predetermined line included in the HDMI cable 14-1. Also, the control reception unit 11c performs reception of transmission control information (transmission request information or reception recognition information: described later) of the dynamic range conversion definition information from the television receiver 13.

Note that the BD recorder 11 has a function of encoding uncompressed image data and a function of writing image data (that is encoded and compressed or that is kept uncompressed) into the storage medium 11f but illustration thereof is omitted.

One end of the HDMI cable 14-1 is connected to the HDMI terminal 11a of the BD recorder 11 and the other end of the HDMI cable 14-1 is connected to an HDMI terminal 13a of the television receiver 13.

The STB 12 includes a tuner unit 12d that receives channel selection of a digital broadcast stream, a decoding unit 12e that reads coded data from the digital broadcast stream received in the tuner unit 12d and performs decoding into an uncompressed image, an information storage unit 12f that acquires dynamic range conversion definition information from the data decoded in the decoding unit 12e and stores the information, an information transmission unit 12g that transmits the dynamic range conversion definition information to the television receiver 13 through the HDMI cable 14-2, an HDMI transmission unit (HDMI TX) 12b that transmits the data decoded in the decoding unit 12e to the television receiver 13 through the HDMI cable 14-2, a control reception unit 12c that receives transmission control information from the television receiver 13, and an HDMI terminal 12a to which the HDMI transmission unit 12b and the control reception unit 12c are connected. There is a case where a function of the control reception unit 12c is embedded in the HDMI transmission unit 12b or realized by utilization of a high-speed bus interface (described later).

For example, the information transmission unit 12g inserts dynamic range conversion definition information into a blanking period (described later) of uncompressed image data transmitted from the HDMI transmission unit 12b or transmits a packet, which stores dynamic range conversion definition information, by using a bi-directional communication path (described later) including a predetermined line included in the HDMI cable 14-2. Also, the control reception unit 12c performs reception of transmission control information (transmission request information or reception recognition information) of the dynamic range conversion definition information from the television receiver 13.

One end of the HDMI cable 14-2 is connected to the HDMI terminal 12a of the STB 12 and the other end of the HDMI cable 14-2 is connected to an HDMI terminal 13f of the television receiver 13.

Note that an STB for an Internet protocol television (IPTV) which STB includes an Ethernet® circuit, which acquires data such as content on the Internet from a content server, separately from the tuner unit 12d that receives channel selection of a digital broadcast stream of the STB 12 illustrated in FIG. 1 may include a configuration similar to that of the STB 12 and can be applied to the AV system 10 as one of HDMI source devices.

In the television receiver 13, the HDMI terminal 13a to which an HDMI reception unit 13b to receive uncompressed image data from the BD recorder 11 and a control transmission unit 13c to transmit transmission control information to the BD recorder 11 are connected, an information reception unit 13d that acquires dynamic range conversion definition information of the uncompressed image data through the transmission path 14-1, a storage unit 13e that stores the dynamic range conversion definition information received in the information reception unit 13d, the HDMI terminal 13f to which an HDMI reception unit 13g to receive uncompressed data from the STB 12 and a control transmission unit 13h to transmit transmission control information to the STB 12 are connected, an information reception unit 13i that acquires dynamic range conversion definition information of the uncompressed image data through the transmission path 14-2, a storage unit 13j that stores the dynamic range conversion definition information received in the information reception unit 13i, a selection unit 13k that selects one of a plurality of HDMI terminals 13a to 13f as an HDMI input, and a signal processing unit 13m that performs dynamic range conversion processing of selected uncompressed image data are provided. Also, the selection unit 13k performs switching of HDMI inputs according to operation of a user with respect, for example, to a user operation unit (not illustrated). There is a case where a function of the control reception unit 11c is embedded in the HDMI transmission unit 11b or realized by utilization of a high-speed bus interface (described later).

The information reception unit 13d/13i receives dynamic range conversion definition information inserted into a blanking period of the uncompressed image data transmitted through the HDMI cable 14-1/14-2 or receives dynamic range conversion definition information through a bi-directional communication path (described later) including a predetermined line included in the HDMI cable 14-1/14-2. Also, the control transmission unit 13c/13h transmits transmission control information (transmission request information or reception recognition information: described later) of dynamic range conversion definition information to the BD recorder 11 or the STB 12. For example, the control transmission unit 13c/13h can transmit transmission control information through a line for detecting device connection, a control data line, or a bi-directional communication path including a predetermined line each of which lines is included in the HDMI cable 14-1/14-2 (described later).

Note that the HDMI transmission unit 11b, the control reception unit 11c, and the information transmission unit 11d of the BD recorder 11 may be in one chip or may include a plurality of cores. Also, the control reception unit 11c and the information transmission unit 11d may be a high-speed bus interface 120 (HEC line: described later) including a predetermined line included in the HDMI cable 14-1.

Also, the HDMI transmission unit 12b, the control reception unit 12c, the information reception unit 12g, and the information storage unit 12f of the STB 12 may be in one chip or may include a plurality of cores. Also, the control reception unit 12c and the information transmission unit 12g may be a high-speed bus interface including a predetermined line included in the HDMI cable 14-2.

Also, the HDMI reception unit 13b/13g, the control transmission unit 13c/13h, the storage unit 13e/13j, and the selection unit 13k of the television receiver 13 may be in one chip or may include a plurality of cores. Also, the control transmission unit 13c/13h and the information reception unit 13d/13i may be the high-speed bus interface 120 (described later) including a predetermined line included in the HDMI cable 14-1.

Uncompressed image data read from the storage medium 11f in the BD recorder 11 and decoded in the decoding unit 11e is originally uncompressed image data with a wide luminance dynamic range but is converted into a dynamic range of standard luminance. That is, what is converted into a dynamic range of standard luminance with respect to an original image having a dynamic range equal to or higher than the standard luminance is transmitted from the BD recorder 11 as the HDMI source device to the television receiver 13. Similarly, uncompressed image data received in the tuner unit 12d in the STB 12 and decoded in the decoding unit 12e is originally uncompressed image data with a wide luminance dynamic range but is converted into a dynamic range of standard luminance. That is, what is converted into a dynamic range of standard luminance with respect to an original image having a dynamic range equal to or higher than the standard luminance is transmitted from the STB 12 as the HDMI source device to the television receiver 13.

On the other hand, the television receiver 13 includes a display device such as an organic display or an LCD that can display an image that is around 1000 cd/m² and is brighter than the standard luminance. In such a case, on a side of the television receiver 13 as the HDMI sink device, it is preferred to perform an image display making use of configuration capability thereof by performing dynamic range inverse conversion with respect to image data, on which dynamic range conversion into standard luminance is performed, and by restoring image data having an original high-luminance dynamic range.

In the AV system 10 according to the present embodiment, in a case of transmitting uncompressed image data from the HDMI transmission units 11b and 12b, the BD recorder 11 and the STB 12 as the HDMI source devices respectively transmits dynamic range conversion definition information thereof from the information transmission units 11d and 12g. In such a case, on a side of the HDMI sink device, it is possible to perform a screen display of an image having an original dynamic range equal to or higher than standard luminance by performing dynamic range inverse conversion with respect to the received uncompressed image data on the basis of the dynamic range conversion definition information.

As a method of performing dynamic range conversion of image data, knee conversion is widely known (see, for example, Patent Document 3). In a case of compressing a dynamic range, knee compression is performed. In a case of restoring an original high dynamic range, knee extension is performed. In the knee compression, an inclination in an input/output characteristic is made small with respect to a luminance signal exceeding a predetermined luminance level called a knee point and a dynamic range is compressed. The knee point is set to be lower than an intended maximum luminance level. Also, the decreased inclination in the input/output characteristic is called a knee slope. In the knee extension, the opposite of the above processing is performed. Dynamic range conversion definition information is information including a parameter necessary for dynamic range conversion such as knee conversion.

For example, in Japanese Patent Application No. 2013-246876 that is already transferred to the present applicant, an AV system that transmits uncompressed image data, on which dynamic range conversion is performed, along with dynamic range conversion definition information from an HDMI source device to an HDMI sink device is disclosed.

[Configuration Example of HDMI Transmission Path]

Figure 2:
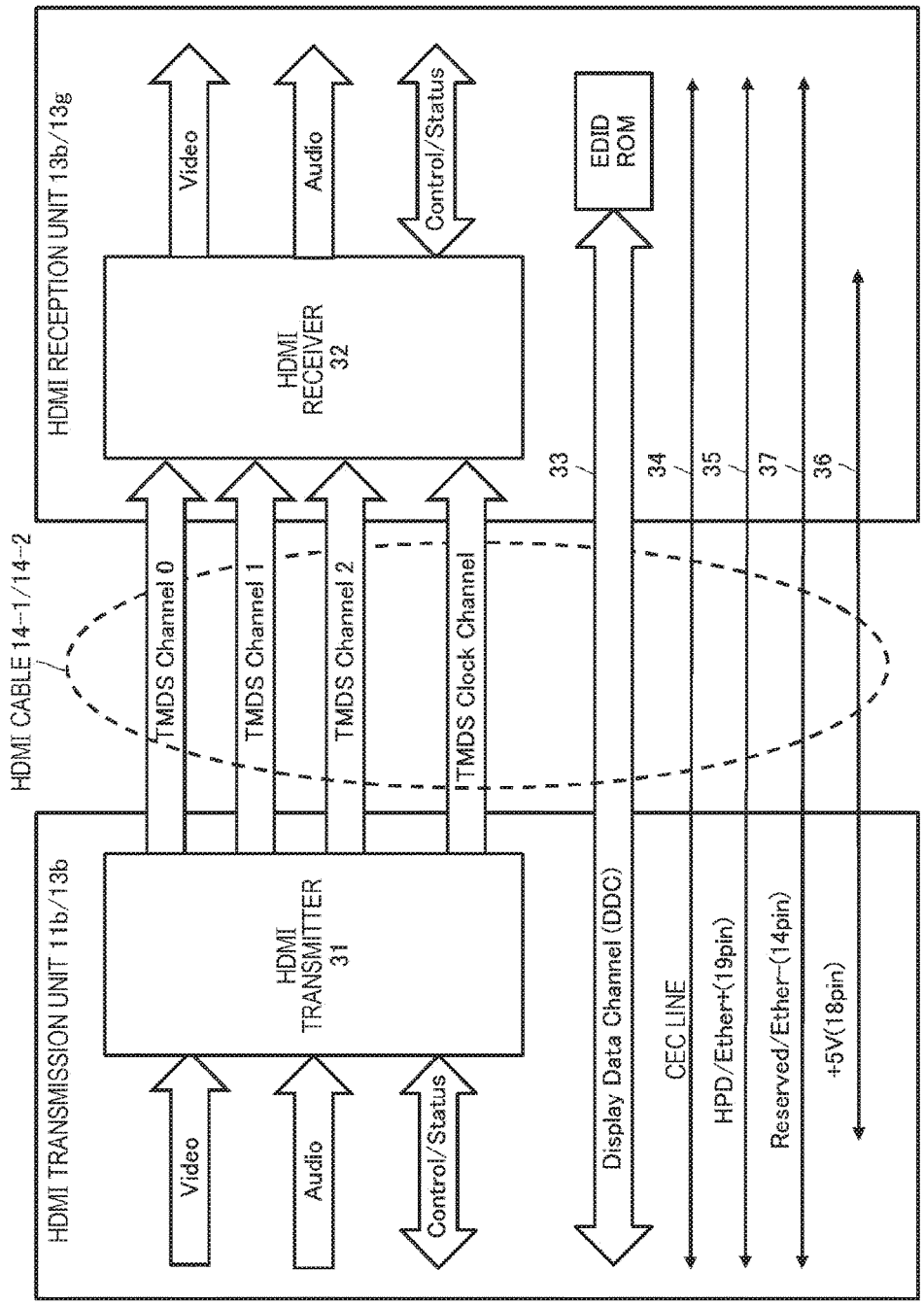
FIG. 2 is a view illustrating an HDMI transmission unit 11b of a BD recorder 11 and an HDMI reception unit 13b of a television receiver 13 in the AV system 10 illustrated in FIG. 1.

In FIG. 2, a configuration example of the HDMI transmission unit 11b of the BD recorder 11 and the HDMI reception unit 13b of the television receiver 13 in the AV system 10 illustrated in FIG. 1 is illustrated. Note that in FIG. 2, the configuration has been described with an example of the HDMI transmission unit 11b and the HDMI reception unit 13b between the BD recorder 11 and the television receiver 13. However, an inner configuration of the HDMI transmission unit 12b of the STB 12 and the HDMI reception unit 13g that are the other combination of an HDMI source device and an HDMI sink device is similar.

The HDMI is a high-speed digital data transmission interface using transition minimized differential signaling (TMDS) in a physical layer. In the example illustrated in FIG. 2, an HDMI cable 14 includes four channels in total which channels are three TDMS channels #0, #1, and #2 for transmission of three kinds of image signals of red (R)/green (G)/blue (B) and one TMDS clock channel for transmission of a reference clock signal. Also, in FIG. 3, periods of various kinds of transmission data in a case where image data with a side×a length being 1920 pixels×1080 lines is transmitted in the TDMS channels #0, #1, and #2 are illustrated.

In an effective image period 21 (hereinafter, also referred to as active video period) that is a period in which a horizontal blanking interval 22 and a vertical blanking interval 23 are removed from a period from one vertical synchronization signal to a next vertical synchronization signal, the HDMI transmission unit 11b transmits a differential signal, which corresponds to pixel data of an uncompressed image in one screen, in one direction in a plurality of channels to the HDMI reception unit 13b. Also, in the horizontal blanking interval 22 or the vertical blanking interval 23, the HDMI transmission unit 11b transmits a differential signal, which at least corresponds to audio data associated with an image, control data, different auxiliary data, or the like, in one direction in a plurality of channels to the HDMI reception unit 13b.

In the effective image period 21 (hereinafter, also referred to as active video period) that is a period in which the horizontal blanking interval 22 and the vertical blanking interval 23 are removed from a period from one vertical synchronization signal to a next vertical synchronization signal, the HDMI transmission unit 11b transmits a differential signal, which corresponds to pixel data of an uncompressed image in one screen, in one direction in a plurality of TMDS channels #0 to #2 to the HDMI reception unit 13b. Also, in the horizontal blanking interval 22 or the vertical blanking interval 23, the HDMI transmission unit 11b transmits a differential signal, which at least corresponds to audio data associated with an image, control data, different auxiliary data, or the like, in one direction in the plurality of TMDS channels #0 to #2 to the HDMI reception unit 13b.

The HDMI transmission unit 11b includes an HDMI transmitter 31. For example, the HDMI transmitter 31 converts pixel data of an uncompressed image into a corresponding differential signal and performs serial transmission to the HDMI reception unit 13b in one direction in the three TMDS channels #0, #1, and #2 that are a plurality of channels.

Also, the HDMI transmitter 31 converts audio data associated with an uncompressed image, necessary control data, different auxiliary data, and the like into a corresponding differential signal and performs serial transmission to the HDMI reception unit 13b in one direction in the three TMDS channels #0, #1, and #2. Moreover, the HDMI transmitter 31 transmits a pixel clock synchronized with pixel data, which is transmitted in the three TMDS channels #0, #1, and #2, in a TMDS clock channel to the HDMI reception unit 13b. Here, in one TMDS channel #i (i=0, 1, or 2), 10-bit pixel data is transmitted in one clock of the pixel clock.

In the active video period 21, the HDMI reception unit 13b receives a differential signal that is transmitted from the HDMI transmission unit 11b in one direction in a plurality of channels and that corresponds to pixel data. Also, in the horizontal blanking interval 22 or the vertical blanking interval 23, the HDMI reception unit 13b receives a differential signal that is transmitted from the HDMI transmission unit 11b in one direction in a plurality of channels and that corresponds to audio data or control data.

That is, the HDMI reception unit 13b includes an HDMI receiver 32. The HDMI receiver 32 receives a differential signal corresponding to pixel data and a differential signal corresponding to audio data or control data which signals are transmitted from the HDMI transmission unit 11b, which is connected through an HDMI cable 15, in one direction in the TMDS channels #0, #1, and #2. Here, the reception is performed in synchronization with a pixel clock that is also transmitted in the TMDS clock channel from the HDMI transmission unit 11b.

As a transmission channel of an HDMI system including the HDMI transmission unit 11b and the HDMI reception unit 13b, there is a transmission channel called a display data channel (DDC) 33 or a consumer electronics control (CEC) line 34 other than the three TMDS channels #0, #1, and #2 as transmission channels to transmit pixel data and audio data and the TMDS clock channel as a transmission channel to transmit a pixel clock. A transmission channel of an HDMI system including the HDMI transmission unit 12b and the HDMI reception unit 13g is in a similar manner.

The DDC 33 includes one signal line included in the HDMI cable 14 and is used by the HDMI transmission unit 11b to read enhanced extended display identification data (E-EDID) from the HDMI reception unit 13b connected through the HDMI cable 14. That is, the HDMI reception unit 13b includes an EDID read only memory (ROM) storing E-EDID that is configuration capability information related to configuration capability of itself in addition to the HDMI receiver 32.

From the HDMI reception unit 13b connected through the HDMI cable 14, the HDMI transmission unit 11b reads the E-EDID of the HDMI reception unit 13b through the DDC 33. Then, on the basis of the E-EDID, the HDMI transmission unit 11b recognizes setting of configuration capability of the HDMI reception unit 13b, that is, a format (profile) of an image, to which an HDMI sink device 13 including the HDMI reception unit 13b corresponds, such as RGB, YCbCr 4:4:4, or YCbCr 4:2:2.

The CEC line 34 includes one signal line included in the HDMI cable 14 and is used to perform bi-directional communication of data for control between the HDMI transmission unit 11b and the HDMI reception unit 13b.

Also, the HDMI cable 14 includes an HPD/Ether+ line 35 connected to a pin 19 called hot plug detect (HPD). The BD recorder 11 (HDMI source device) can detect connection of an HDMI sink device such as the television receiver 13 with DC bias potential by using the HPD/Ether+ line 35. In this case, when seen from the side of the HDMI source device, an HPD line/Ether+ 35 has a function of receiving notification of a connection state from the HDMI sink device with DC bias potential. On the other hand, when seen from the side of the HDMI sink device, the HPD line 35 has a function of notifying a connection state to the HDMI source device with DC bias potential.

Also, the HDMI cable 14-1 includes a power supply line 36 used to supply power from the HDMI source device to the HDMI sink device.

Moreover, the HDMI cable 14 includes a reserve/Ether– line 37 connected to an idle (reserved) pin 14. There is a case where a pair of differential transmission paths is configured with the HPD/Ether+ line 35 and the reserve/Ether– line 37 and is used as a bi-directional communication path capable of performing high-speed local area network (LAN) communication, that is, a high-speed bus (high speed Ether channel: HEC). It is possible to perform high-speed data communication through such a high-speed bus (HEC line) between a high-speed bus interface (described later) on a side of the BD recorder 11 and a corresponding high-speed bus interface (described later) on a side of the television receiver 13. Similarly, it is possible to perform high-speed data communication through a high-speed bus (HEC line) between a high-speed bus interface (described later) on a side of the STB 12 and a corresponding high-speed bus interface (described later) on a side of the television receiver 13.

[Configuration Example of TMDS Channel]

Here, a period of the TDMS transmission data illustrated in FIG. 3 will be described in detail. In a video field in which transmission data is transmitted in the three TMDS channels #0, #1, and #2 of the HDMI, there are three periods according to kinds of transmission data which periods are a video data period 24 filled with lines inclined to the right in the drawing, a data island period 25 filled with lines inclined to the left, and a control period 26 filled with dots.

Here, a video field period is a period from a rising edge (active edge) of a vertical synchronization signal to a rising edge of a next vertical synchronization signal and is divided into the horizontal blanking interval 22 (horizontal blanking), the vertical blanking interval 23 (vertical blanking), and an active pixel period 21 (active video) that is a period in which the horizontal blanking interval and the vertical blanking interval are removed from the video field period.

The video data period 24 is assigned to the active pixel period 21. In this video data period 24, data of active pixels of 1920 pixels×1080 lines included in uncompressed image data in one screen is transmitted. On the other hand, the data island period 25 and the control period 26 are assigned to the horizontal blanking interval 22 and the vertical blanking interval 23. In the data island period 25 and the control period 26, auxiliary data is transmitted.

That is, the data island period 25 is assigned to a part of the horizontal blanking interval 22 and the vertical blanking interval 23. In this data island period 25, data, which is not related to control among auxiliary data, such as a packet of audio data, or the like is transmitted. Also, the control period 26 is assigned to the other part of the horizontal blanking interval 22 and the vertical blanking interval 23. In this control period 26, data, which is related to control among auxiliary data, such as a vertical synchronization signal, a horizontal synchronization signal, a control packet, or the like is transmitted.

[Configuration Example of BD Recorder]

In FIG. 4, a configuration example of the BD recorder 11 as an HDMI source device is illustrated. The illustrated BD recorder 11 includes the HDMI terminal 11a, an HDMI transmission unit 119, and a high-speed bus interface 120. Here, the HDMI transmission unit 119 may include a configuration corresponding to the HDMI transmission unit 11b illustrated in FIG. 1 or may include a configuration in which the control reception unit 11c is included in the HDMI transmission unit 11b.

Also, the BD recorder 11 includes a central processing unit (CPU) 101, an internal bus 102, a flash read only memory (ROM) 103, a synchronous random access memory (SDRAM) 104, a remote control reception unit 105, and a remote control transmitter 106.

Also, the BD recorder 11 includes a storage medium control interface 107 and at least one recording medium among, a Blu-ray Disc (BD) drive 108, a hard disk drive (HDD) drive 109, and a solid state disc (SSD) 118. In a case where the BD drive 108 or the HDD 109 is mounted as a recording medium, a serial advanced technology attachment (SATA) interface is included as a recording medium control interface 107. Also, in a case where the SSD 118 is mounted as a recording medium, peripheral component interconnect (PCI) express may be used as the recording medium interface 107.

Also, the BD recorder 11 includes a moving picture expert group (MPEG) decoder 110, a graphic generation circuit 111, an image output terminal 112, and an audio output terminal 113.

Also, the BD recorder 11 may include a display control unit 114, a panel driving circuit 115, a display panel 116, and a power supply unit 117. The high-speed bus interface 120, the CPU 101, the flash ROM 103, the SDRAM 104, the remote control reception unit 105, the storage medium control interface 107, and the MPEG decoder 110 are connected to the internal bus 102. The HDM transmission unit 119 and the high-speed bus interface 120 are connected to the HDMI terminal 11a.

The CPU 101 controls an operation of each unit of the BD recorder 11. The flash ROM 103 stores control software and retains data. The SDRAM 104 configures a work area of the CPU 101. The CPU 101 activates software by expanding software or data read from the flash ROM 103 on the SDRAM 104 and controls each unit of the BD recorder 11.

The remote control reception unit 105 receives a remote control signal (remote control code) transmitted from the remote control transmitter 106 and supplies the signal to the CPU 101. The CPU 101 controls each unit of the BD recorder 11 according to the remote control code. Note that in the illustrated example, the BD recorder 11 includes the remote control transmitter 106 as a user instruction input unit. However, a user instruction input unit of the BD recorder 11 may include a different configuration such as a touch panel unit in which an instruction is input with a switch, a wheel, or a contact/touch, a gesture input unit to detect an instruction input with a mouse, a keyboard, or a camera, or an audio input unit to perform an instruction input with audio (none is illustrated).

The BD drive 108 records content data in a BD disc (not illustrated) as a disk-shaped recording medium or reproduces content data from this BD. The BD drive 108 is connected to the internal bus 102 through the recording medium control interface 107. Also, the HDD drive 109 records content data in the HDD or reproduces content data from this HDD. The HDD drive 109 is connected to the internal bus 102 through the recording medium control interface 107. Also, the SSD 118 records content data or content data is reproduced from this SSD 118. This SSD 118 is connected to the internal bus 102 through the recording medium control interface 107. The MPEG decoder 110 performs decoding processing with respect to an MPEG2 stream reproduced in the BD drive 108, the HDD drive 109, or the SSD 118 and acquires data of an image or audio.

The graphic generation circuit 111 performs superimposition processing of graphic data or the like with respect to the image data, which is acquired in the MPEG decoder 110, when necessary. The image output terminal 112 outputs the image data output from the graphic generation circuit 111. The audio output terminal 113 outputs the audio data acquired in the MPEG decoder 110.

The panel driving circuit 115 drives the display panel 116 on the basis of the image data output from the graphic generation circuit 111. The display control unit 114 controls the graphic generation circuit 111 or the panel driving circuit 115 and controls a display on the display panel 116. The display panel 116 includes, for example, a liquid crystal display (LCD) or an organic electro-luminescence (organic EL) panel.

Note that in FIG. 4, the configuration example in which the display control unit 114 is included in addition to the CPU 101 is illustrated. However, the CPU 101 may directly control a display on the display panel 116. Also, the CPU 101 and the display control unit 114 may be in one chip or may include a plurality of cores. The power supply unit 117 supplies power to each unit of the BD recorder 11. This power supply unit 117 may be an AC power supply or a battery (storage battery or dry-cell battery).

The HDMI transmission unit (HDMI source device) 119 transmits data of a baseband image and audio from the HDMI terminal 11*a* to the television receiver 13 (HDMI sink device) by communication compliant with the HDMI.

The high-speed bus interface 120 is an interface of a bi-directional communication path to perform high-speed data communication with a high-speed bus interface 13*c* on a side of the television receiver 13 (HDMI sink device) through a bi-directional communication path including a predetermined line included in the HDMI cable 14-1 (HEC line including pair of differential transmission path using HPD/Ether+ line 35 and reserve/Ether− line 37 illustrated in FIG. 2 in present embodiment).

This high-speed bus interface 120 is inserted between the internal bus 102 and the HDMI terminal 11*a*. This high-speed bus interface 11*c* transmits transmission data, which is supplied from the CPU 101, to a device on the other side (HDMI sink device) from the HDMI terminal 11*a* through the HDMI cable 14. Also, this high-speed bus interface 11*c* supplies reception data, which is received from the device on the other side (HDMI sink device), to the CPU 101 from the HDMI cable 14-1 through the HDMI terminal 11*a*. There is a case where the high-speed bus interface 120 is used as the control reception unit 11*c* in FIG. 1.

An operation of the BD recorder 11 illustrated in FIG. 4 will be described briefly. In recording, content data to be recorded is acquired through a digital tuner (not illustrated) or from the HDMI terminal 11*a* through the high-speed bus interface 120. This content data is input into the recording medium control interface 107 and is recorded into a BD medium by the BD drive 108 or recorded into the HDD drive 109 or the SSD 118.

On the other hand, in reproduction, content data (MPEG stream) reproduced from a BD medium by the BD drive 108 or reproduced from the HDD drive 109 or the SSD 118 is supplied to the MPEG decoder 110 through the recording medium control interface 107. In the MPEG decoder 110, decoding processing is performed with respect to the reproduced content data and data of an image or audio in a baseband is acquired. The image data is output from the image output terminal 112 to the outside through the graphic generation circuit 111. Also, the audio data is output from the audio output terminal 113 to the outside.

Also, in reproduction, the image data acquired in the MPEG decoder 110 is supplied to the panel driving circuit 115 through the graphic generation circuit 111 according to user operation and a reproduced image is displayed on the display panel 116. Also, the audio data acquired in the MPEG decoder 110 is supplied to a speaker (not illustrated) according to user operation and audio corresponding to the reproduced image is output.

Also, in a case where data of an image and audio which data is acquired in the MPEG decoder 110 is transmitted in a TMDS channel of the HDMI in this reproduction, the data of an image or audio is supplied to the HDMI transmission unit 119, packed, and output from the HDMI transmission unit 119 to the HDMI terminal 11*a*.

Note that in a case where compressed content data read from the BD drive 108, the HDD drive 109, or the SSD 118 is transmitted to the bi-directional communication path of the HDMI cable 14-1, the compressed content data is output to the HDMI terminal 119 through the high-speed bus interface 120. Here, before being output, the compressed content data may be encrypted by utilization of a copyright protection technology such as a high-bandwidth digital content protection (HDCP), digital transmission content protection (DTCP), or DTCP+.

In the present specification, the BD recorder 11 or the STB 12 has been described as an HDMI source device that can be used in an AV system to which a technology disclosed in the present specification is applied. However, various different kinds of HDMI-corresponding devices to transmit uncompressed image data which devices are, for example, a disk recorder other than a BD, a disk player, a game device, a network attached storage (NAS), and a digital video camera can be used.

[Configuration Example of Television Receiver]

In FIG. 5, a configuration example of the television receiver 13 as an HDMI sink device is illustrated. This television receiver 13 includes the HDMI terminals 13*a* and 13*f*, HDMI reception units 220 and 222, and high-speed bus interfaces 221 and 223.

Also, the television receiver 13 includes an antenna terminal 201, a digital tuner 202, an MPEG decoder 203, an image signal processing circuit 204, a graphic generation circuit 205, a panel driving circuit 206, and a display panel 207.

Also, the television receiver 13 includes an audio signal processing circuit 208, an audio amplification circuit 209, a speaker 210, an internal bus 211, a CPU 212, a flash ROM 213, and an SDRAM 214. Also, the television receiver 13 includes a wireless transmission/reception unit 217, a remote control reception unit 215, and a remote control transmitter 216. Also, the television receiver 13 includes a display control unit 218 and a power supply unit 219.

The antenna terminal 201 is a terminal that inputs a television broadcast signal received by a reception antenna (not illustrated). The digital tuner 202 processes the television broadcast signal input in the antenna terminal 201 and extracts a partial transport stream (TS) (TS packet of image data and TS packet of audio data) from a predetermined transport stream corresponding to a selection channel of a user.

Also, the digital tuner 202 extracts program specific information/service information (PSI/SI) from the acquired transport stream and performs an output to the CPU 212. It becomes possible to perform processing of extracting a partial TS of an arbitrary channel from a plurality of transport streams acquired in the digital tuner 202 when information of a packet ID (PID) of the arbitrary channel is acquired from the PSI/SI (PAT/PMT).

The MPEG decoder 203 performs decoding processing on an image packetized elementary stream (PES) packet including a TS packet of image data acquired in the digital tuner 202 and acquires the image data. Also, the MPEG decoder 203 performs decoding processing on an audio PES packet including a TS packet of audio data acquired in the digital tuner 202 and acquires the audio data.

The image signal processing circuit 204 and the graphic generation circuit 205 perform scaling processing (resolution converting processing), dynamic range adjustment processing, superimposition processing of graphic data, or the like when necessary with respect to image data acquired in the MPEG decoder 203 or image data received in the HDMI reception unit 220 or 222. In a case of performing the dynamic range adjustment processing, dynamic range inverse conversion is performed on the basis of image data and dynamic range conversion definition information received from the HDMI source device (BD recorder 11 or STB 12) that is a source of transmission of the image data, the digital tuner 202, or the wireless transmission/reception unit 217.

Note that, for example, according to operation of a user on a user operation unit (not illustrated), the CPU 212 gives the image signal processing circuit 204 an instruction indicating which of the HDMI reception units 220 and 222 is to be an input to the image signal processing circuit 204, that is, an instruction of HDMI input switching (processing operation corresponding to selection unit 13k in FIG. 1).

The panel driving circuit 206 drives the display panel 207 on the basis of image (image) data output from the graphic generation circuit 205. The display control unit 218 controls the graphic generation circuit 205 or the panel driving circuit 206 and controls a display on the display panel 207. The display panel 207 includes, for example, an LCD or an organic EL panel.

Note that in FIG. 5, the example in which the display control unit 218 is included in addition to the CPU 212 is illustrated. However, the CPU 212 may directly control a display on the display panel 207. Also, the CPU 212 and the display control unit 218 may be in one chip or my include a plurality of cores. The power supply unit 219 supplies power to each unit of the television receiver 13. This power supply unit 219 may be an AC power supply or a battery (storage battery or dry-cell battery).

The audio signal processing circuit 208 performs necessary processing such as D/A conversion with respect to audio data acquired in the MPEG decoder 203. The audio amplification circuit 209 amplifies an audio signal output from the audio signal processing circuit 208 and supplies the signal to the speaker 210. Note that the speaker 210 may be monaural or stereo. Also, there may be one or more speakers 210. Also, the speaker 210 may be earphones or headphones. Also, the speaker 210 may be what corresponds to 2.1 channel or 5.1 channel. Also, the speaker 210 may be connected to the television receiver 13 in a wireless manner.

Also, the speaker 210 may be a different device that is externally connected to the television receiver 13.

The CPU 212 controls an operation of each unit of the television receiver 13. The flash ROM 213 stores control software and retains data. The SDRAM 214 configures a work area of the CPU 212. The CPU 212 activates software by expanding software or data read from the flash ROM 213 on the SDRAM 214 and controls each unit of the television receiver 13.

The remote control reception unit 215 receives a remote control signal (remote control code) transmitted from the remote control transmitter 216 and supplies the signal to the CPU 212. The CPU 212 controls each unit of the television receiver 13 on the basis of this remote control code. Note that in the example illustrated in FIG. 5, the remote control transmitter 216 is illustrated as the user instruction input unit. However, a user instruction input unit of the television receiver 13 may include a different configuration such as a touch panel unit in which an instruction input is performed with a contact/touch, a gesture input unit to detect an instruction input with a mouse, a keyboard, or a camera, or an audio input unit to perform an instruction input with audio (none is illustrated).

The high-speed bus interfaces 221 and 223, the CPU 212, the flash ROM 213, the SDRAM 214, the wireless transmission/reception circuit 217, the MPEG decoder 203, and the display control unit 218 are connected to the internal bus 211. Also, the high-speed bus interface 221 and the HDMI reception unit 220 are connected to the HDMI terminal 13a and the high-speed bus interface 223 and the HDMI reception unit 222 are connected to the HDMI terminal 13f.

By communication compliant with the HDMI, the HDMI reception units (HDMI sink device) 220 and 222 respectively receive uncompressed image audio data supplied to the HDMI terminals 13a and 13f through the HDMI cables 14-1 and 14-2. Here, the HDMI reception unit 220 may include a configuration corresponding to the HDMI reception unit 13b illustrated in FIG. 1 or may include a configuration in which the control transmission unit 13c is included in the HDMI reception unit 13b. Also, the HDMI reception unit 222 may include a configuration corresponding to the HDMI reception unit 13g illustrated in FIG. 1 or may include a configuration in which the control transmission unit 13h is included in the HDMI reception unit 13g.

Similarly to the high-speed bus interface 120 of the BD recorder 11, each of the high-speed bus interfaces 221 and 223 is an interface of a bi-directional communication path to perform high-speed data communication between the BD recorder 11 and each of the high-speed bus interfaces 11c and 12c on the side of the STB 12 through a bi-directional communication path including a predetermined line included in each of the HDMI cables 14-1 and 14-2 (HEC line including pair of differential transmission path using HPD/Ether+ line 35 and reserve/Ether– line 37 illustrated in FIG. 2 in present embodiment). These high-speed bus interfaces 221 and 223 are respectively inserted between the internal bus 211 and the HDMI terminals 13a and 13f. There is a case where the high-speed bus interfaces 221 and 223 are respectively used as the control transmission units 13c and 13h in FIG. 1.

These high-speed bus interfaces 221 and 223 respectively transmit transmission data, which is supplied from the CPU 212, to a device on the other side (HDMI source device) from the HDMI terminals 13a and 13f through the HDMI cables 14-1 and 14-2. Also, these high-speed bus interfaces 221 and 223 respectively supply, to the CPU 212, the transmission data received from the device on the other side (HDMI source device) from the HDMI cables 14-1 and 14-2 through the HDMI terminals 13a and 13f.

Note that, for example, in a case where the received compressed content data is transmitted/received through the bi-directional communication path of the HDMI cable 14-1/14-2, the compressed content data is input/output in the HDMI terminal 13a or 13f through the high-speed bus interface 221 or 223. Here, before being output, the compressed content data may be encrypted by utilization of a copyright protection technology such as HDCP, DTCP, or DTCP+.

The wireless transmission/reception unit 217 performs wireless communication between the CPU 212 and the external device through the internal bus 211. The wireless transmission/reception unit 217 performs the wireless communication in accordance with a wireless communication standard such as wireless fidelity (Wi-Fi)®, Bluetooth® communication, or Bluetooth® low energy (BLE) communication.

Note that there is a case where the television receiver 13 receives image audio data delivered by IPTV or the like. For example, even when the television receiver 13 includes an Ethernet® circuit and an Ethernet® terminal instead of the wireless transmission/reception unit 217 (or in addition to wireless transmission/reception unit 217), a similar function can be realized.

An operation of the television receiver 13 illustrated in FIG. 5 will be described briefly. A television broadcast signal input into the antenna terminal 201 is supplied to the digital tuner 202. In the digital tuner 202, a television broadcast signal is processed, a predetermined transport stream corresponding to a selection channel of a user is output, a partial TS (TS packet of image data and TS packet of audio data) is extracted from the transport stream, and the partial TS is supplied to the MPEG decoder 203.

In the MPEG decoder 203, decoding processing is performed with respect to an image PES packet including a TS packet of image data, and image data is acquired. This image data is supplied to the panel driving circuit 206 after scaling processing (resolution converting processing), dynamic range adjustment processing, superimposition processing of graphic data, or the like is performed in the image signal processing circuit 204 and the graphic generation circuit 205 when necessary. Thus, an image corresponding to a selection channel of a user is displayed on the display panel 207.

Also, in the MPEG decoder 203, decoding processing is performed with respect to an audio PES packet including a TS packet of audio data, and audio data is acquired. This audio data is supplied to the speaker 210 after necessary processing such as D/A conversion in the audio signal processing circuit 208 and amplification in the audio amplification circuit 209. Thus, audio corresponding to a selection channel of a user is output from the speaker 210.

Also, compressed content data supplied from the HDMI terminal 13a or 13f through the high-speed bus interface 221 or 223 is supplied to the MPEG decoder 203 through the internal bus 211. Hereinafter, an operation is similar to that in the above-described case of receiving a television broadcast signal. An image is displayed on the display panel 207 and audio is output from the speaker 210.

Also, in the HDMI reception unit 220 or 222, uncompressed image audio data transmitted from an HDMI source device such as the BD recorder 11 or the STB 12 connected to the HDMI terminal 13a or 13f through the HDMI cable 14-1 or 14-2 is acquired. The received image data is supplied to the image signal processing circuit 204. Also, the received audio data is directly supplied to the audio signal processing circuit 208. Hereinafter, an operation is similar to that in the above-described case of receiving a television broadcast signal. An image is displayed on the display panel 207 and audio is output from the speaker 210.

[Dynamic Range Conversion Definition Information]

There is a case where uncompressed image data output from the HDMI source device is image data compressed into a dynamic range of standard luminance by dynamic range conversion with respect to an original image having a dynamic range equal to or higher than standard luminance. In such a case, the HDMI source device transmits dynamic range conversion definition information, which is used in processing of dynamic range conversion of original uncompressed image data, along with uncompressed data. On the other hand, in a case where an HDMI sink device is a display that can display an image brighter than standard luminance, an image display making use of configuration capability thereof can be performed by dynamic range inverse conversion with respect to received image data based on the dynamic range conversion definition information.

As a method of performing dynamic range conversion of image data, knee conversion is widely known (see, for example, Patent Document 3). In a case of compressing a dynamic range, knee compression is performed. In a case of restoring original high dynamic range, knee extension is performed. In the knee compression, an inclination in an input/output characteristic is made small with respect to a luminance signal exceeding a predetermined luminance level called a knee point and a dynamic range is compressed. The knee point is set to be lower than an intended maximum luminance level. Also, the decreased inclination in the input/output characteristic is called a knee slope. In the knee extension, the opposite of the above processing is performed. Dynamic range conversion definition information is information including a parameter necessary for dynamic range conversion such as knee conversion.

In the AV system 10 illustrated in FIG. 1, dynamic range conversion definition information of uncompressed image data is read from a digital broadcast stream received by the storage medium 11f of the BD recorder 11 or by the STB 12. In FIG. 6, a syntax example of "knee_function_info supplemental enhancement information (SEI)" 600 that is dynamic range conversion definition information of uncompressed image data and that is defined by the MPEG is illustrated.

In knee_function_info 600, a knee conversion ID (knee_function_id) 601 and a knee conversion cancel flag (knee_function_cancel_flag) 602 are set.

The knee conversion ID 601 is an ID unique for a purpose of knee conversion that is knee compression or knee extension. Also, the knee conversion cancel flag 602 is a flag indicating whether to cancel continuity of previous knee_function_info. The knee conversion cancel flag 602 is set to a high level "1" in a case of canceling the continuity of previous knee_function_info and is set to a low level "0" in a case where cancellation is not performed.

Also, in a case where the knee conversion cancel flag 602 is the low level"0," dynamic range conversion definition information is set in knee_function_info 600. In this dynamic range conversion definition information, a persistence flag (knee_function_persistence_flag) 603, a compression/extension flag (mapping_flag) 604, input image dynamic range information (input_d_range) 605, maximum luminance information of a display displaying an input image (input_disp_luminance) 606, output image dynamic range information (output_d_range) 607, maximum luminance information of a display displaying an output (output_disp_luminance) 608, and information of the number of knee positions (num_knee_point_minus1) 609 are set. Moreover, a loop 610 of information at each knee position is arranged for a number in the information of the number of knee positions 609 and positional information before conversion (input_knee_point) 611 and positional information after conversion (output_knee_point) 612 at each knee position are set for each knee position.

The persistence flag 603 is what indicates whether knee_function_info 200 that is transmitted once is valid thereafter or is valid only once. In a case where validity is limited to a picture to which knee_function_info 600 is added, the persistence flag 603 is set to a low level "0." In a case where validity is until a stream is switched or until a new knee conversion ID 601 arrives, the persistence flag 603 is set to a high level "1."

The compression/extension flag 604 is a flag indicating whether knee conversion is knee compression. That is, in a case where the number of knee positions is one, when the positional information before conversion is equal to or larger than the positional information after conversion, it can be determined that the knee conversion is knee extension. In a case where the positional information before conversion is smaller than the positional information after conversion, it can be determined that the knee conversion is knee compression.

However, in a case where there are a plurality of knee positions, it is not possible to accurately determine whether the knee conversion is knee extension or knee compression on the basis of a relationship between magnitude of the positional information before conversion and the positional information after conversion. Thus, the compression/extension flag 604 is set. Note that even when the number of knee points is one, the compression/extension flag 604 may be set. In a case where the knee conversion is the knee compression, the compression/extension flag 604 is set to a high level "1." In a case of the knee extension, setting to a low level "0" is performed.

The information of the number of knee positions 609 is a value in which one is subtracted from the number of knee positions. Note that order i (i is integral number equal to or larger than 0) in which positional information before conversion 611 and positional information after conversion 612 of a knee position are set is ascending order of the positional information before conversion 611. In each of the following loops for the number of knee positions, the positional information before conversion 611 and the positional information after conversion 612 at a knee position i are stored.

The positional information before conversion 611 is information indicating a knee position of an image to be encoded before conversion in dynamic range conversion and is expressed by a permillage of a knee position in a case where the maximum value of luminance of the image to be encoded is 1000‰. The knee position is luminance in a range of luminance, which is to be knee converted in the same conversion rate in a dynamic range of luminance of the image to be encoded, except for 0 at a starting point.

Also, the positional information after conversion 612 is information indicating a starting point of a range of luminance, which corresponds to a range of luminance to be knee converted with a knee position as a starting point, of an image after conversion in the dynamic range conversion. More specifically, the positional information after conversion (output_knee_point) is expressed by a permillage of luminance of the image after the conversion which luminance corresponds to a knee position in a case where the maximum value of luminance of the image after the conversion is 1000‰.

Figure 21:
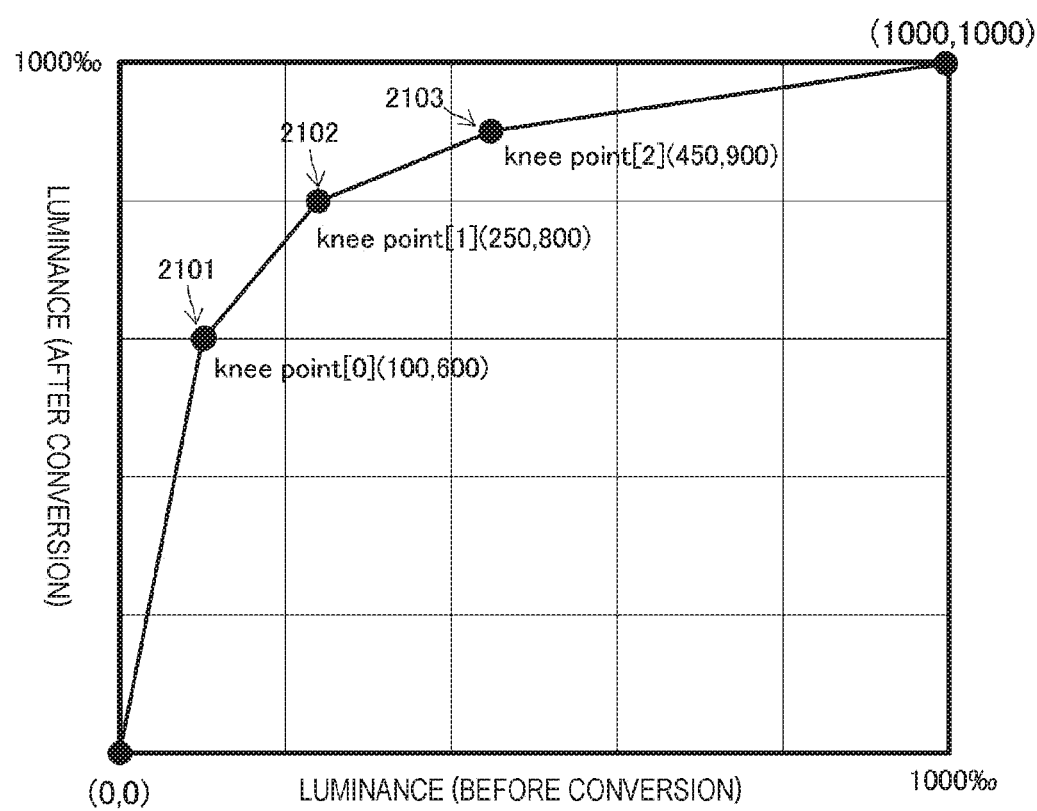
FIG. 21 is a view for describing the dynamic range conversion definition information.

In FIG. 21, an example of the dynamic range conversion definition information is illustrated. In the drawing, a horizontal axis is a dynamic range before conversion and a vertical axis is a dynamic range after conversion. A user sets, as an intended conversion image, a second dynamic range image that is acquired as a result of respectively performing knee conversion of 0 to 40%, 40 to 100%, 100 to 180%, and 180 to 400% of luminance of a high dynamic range image into 0 to 60%, 60 to 80%, 80 to 90%, and 90 to 100%.

In this case, in knee_function_info SEI, 100 is set as positional information before conversion (input_knee_point [0]) of a first knee position 2101 and 600 is set as positional information after conversion (output_knee_point [0]) thereof. Also, 250 is set as positional information before conversion (input_knee_point [1]) of a second knee position 2102 and 800 is set as positional information after conversion (output_knee_point [1]) thereof. Also, 450 is set as positional information before conversion (input_knee_point [2]) of a third knee position 2103 and 900 is set as positional information after conversion (output_knee_point [2]) thereof.

Also, in the example illustrated in FIG. 21, as different parameters of knee_function_info SEI, it is assumed that the input image dynamic range information (input_d_range) is 4000, the maximum luminance information of a display displaying an input image (input_disp_luminance) is 800 (cd/m$^2$), and the compression flag (mapping_flag) is 1.

Thus, when receiving the dynamic range conversion definition information illustrated in FIG. 21, the television receiver 13 recognizes that luminance at the first to third knee positions output_knee_point is respectively 60%, 80%, and 90%. Also, the television receiver 13 recognizes that the maximum value of luminance of an image to be encoded is 400% on the basis of the input image dynamic range information (input_d_range) 605.

Then, the television receiver 13 respectively performs knee conversion of 0 to 40%, 40 to 100%, 100 to 180%, and 180 to 400% of luminance of a high dynamic range image acquired as a result of decoding into 0 to 60%, 60 to 80%, 80 to 90%, and 90 to 100% by connecting knee positions in order of setting. As a result, the television receiver 13 can convert the high dynamic range image acquired as a result of decoding into the intended second dynamic range image.

For example, an HDMI source device such as the BD recorder 11 can insert dynamic range conversion definition information into a blanking period (data island period 25 or control period 26) of uncompressed image data and can perform transmission to an HDMI sink device such as the television receiver 13. Alternatively, the BD recorder 11 can transmit dynamic range conversion definition information to the television receiver 13 through the bi-directional communication path (HEC line) including the HPD/Ether+ line 35 and the reserve/Ether− line 37.

[Transmission Method of Dynamic Range Conversion Definition Information]

Figure 7:
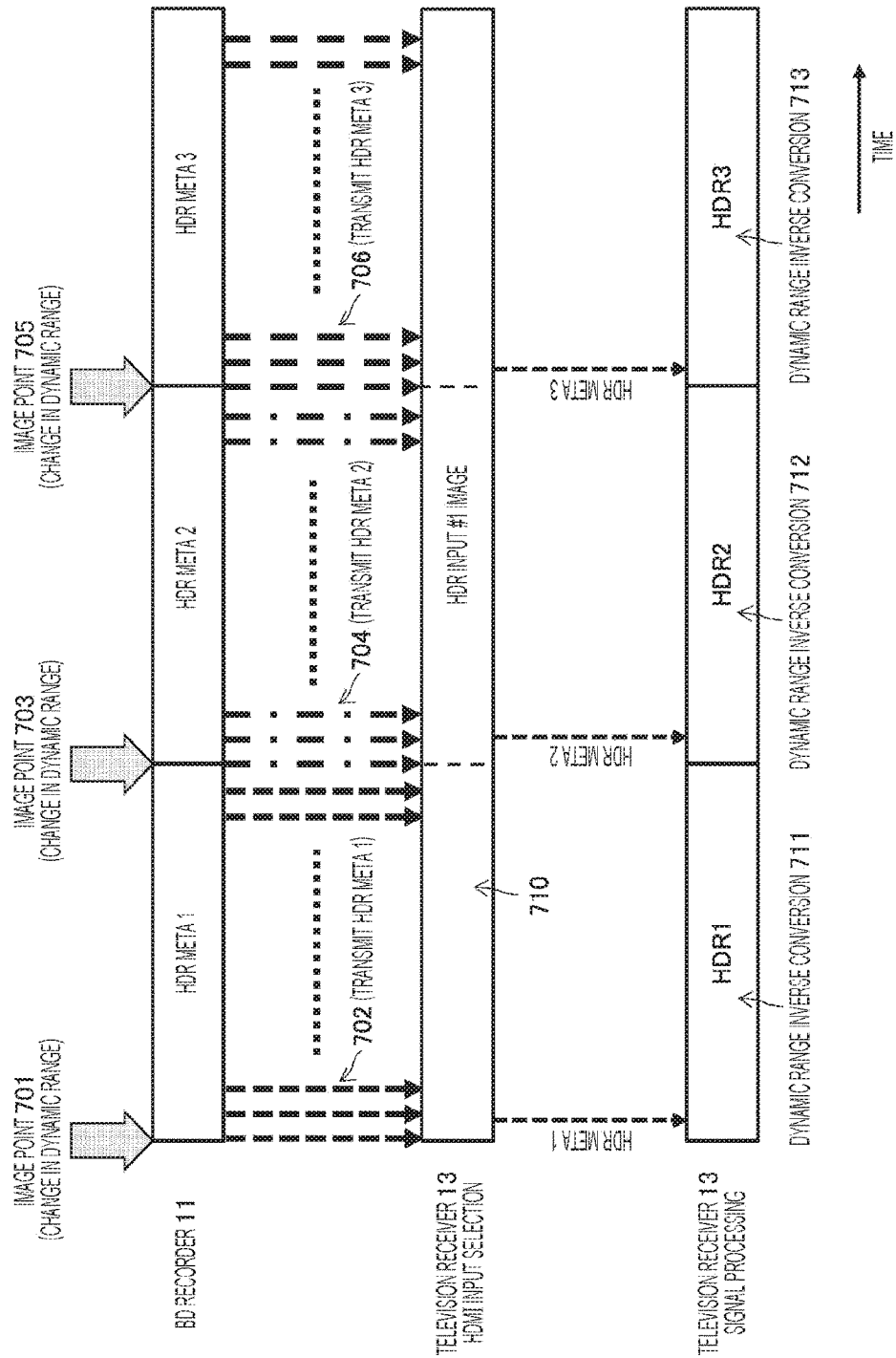
FIG. 7 is a view illustrating an example of a transmission method of the dynamic range conversion definition information.

In FIG. 7, an example of a transmission method of dynamic range conversion definition information between the BD recorder 11 (HDMI source device) and the television receiver 13 (HDMI sink device) is illustrated. The transmission method of the dynamic range conversion definition information will be described with reference to FIG. 7.

When the BD recorder 11 transmits a reproduced image to a transmission path (HDMI cable 14-1), there is a method of transmitting dynamic range conversion definition information of the reproduced image at regular intervals. With an image point 701 at which a dynamic range of uncompressed image data is changed as a starting point, in a period to an image point 703 at which a dynamic range of the uncompressed image data is subsequently changed, the information transmission unit 11d of the BD recorder 11 repeatedly transmits the same dynamic range conversion definition information (HDR meta 1) as indicated by a reference number 702.

Similarly, in a period from the image point 703 to an image point 705, the information transmission unit 11d of the BD recorder 11 repeatedly transmits the same dynamic range conversion definition information (HDR meta 2) as indicated by a reference number 704. Also, in a period from the image point 705 to a next image point (not illustrated), the information transmission unit 11d of the BD recorder 11 repeatedly transmits the same dynamic range conversion definition information (HDR meta 3) as indicated by a reference number 706.

In the transmission method illustrated in FIG. 7, dynamic range conversion definition information is constantly transmitted to a transmission path. Thus, on a side of the television receiver 13, it is possible to perform correct dynamic range conversion processing when dynamic range conversion definition information is acquired at arbitrary timing.

Here, a description will be made on the assumption that fixation to an HDMI input from the BD recorder 11 (referred to as "HDMI input #1") is kept performed on the side of the television receiver 13 as indicated by a reference number 710. In a period from the image points 701 to 703, the dynamic range conversion definition information (HDR meta 1) is received in the information reception unit 13d from the BD recorder 11 at arbitrary timing, and the image signal processing circuit 204 and the graphic generation circuit 205 can correctly perform dynamic range inverse conversion of image data input from the BD recorder 11 and can reproduce an original high luminance image (HDR1) as indicated by a reference number 711.

Subsequently, in a period from the image points 703 to 705, the dynamic range conversion definition information (HDR meta 2) is received from the BD recorder 11 at arbitrary timing and dynamic range inverse conversion of image data input from the BD recorder 11 is correctly performed, whereby it is possible to reproduce an original high luminance image (HDR2) as indicated by a reference number 712.

Then, in a period from the image point 705 to a next image point, the dynamic range conversion definition information (HDR meta 3) is received from the BD recorder 11 at arbitrary timing and dynamic range inverse conversion of image data input from the BD recorder 11 is correctly performed, whereby it is possible to reproduce an original high luminance image (HDR3) as indicated by a reference number 713.

However, as illustrated in FIG. 7, with the method of constantly transmitting dynamic range conversion definition information, a situation in which it is not possible to transmit dynamic range conversion definition information frequently due to limitation in transmission capacity of a transmission path is assumed. Thus, a method of thinning and transmitting dynamic range conversion definition information is defined. More specifically, in the syntax example of "knee_function_info supplemental enhancement information (SEI)" 600 illustrated in FIG. 6, the persistence flag (knee_function_persistence_flag) 603 is provided. The persistence flag 603 indicates whether knee_function_info 200 that is transmitted once is valid thereafter or is valid only once. That is, when the persistence flag 603 is set to the high level "1," it is indicated that dynamic range conversion definition information is valid until a stream is switched or a new knee conversion ID 601 arrives (described above).

Figure 8:
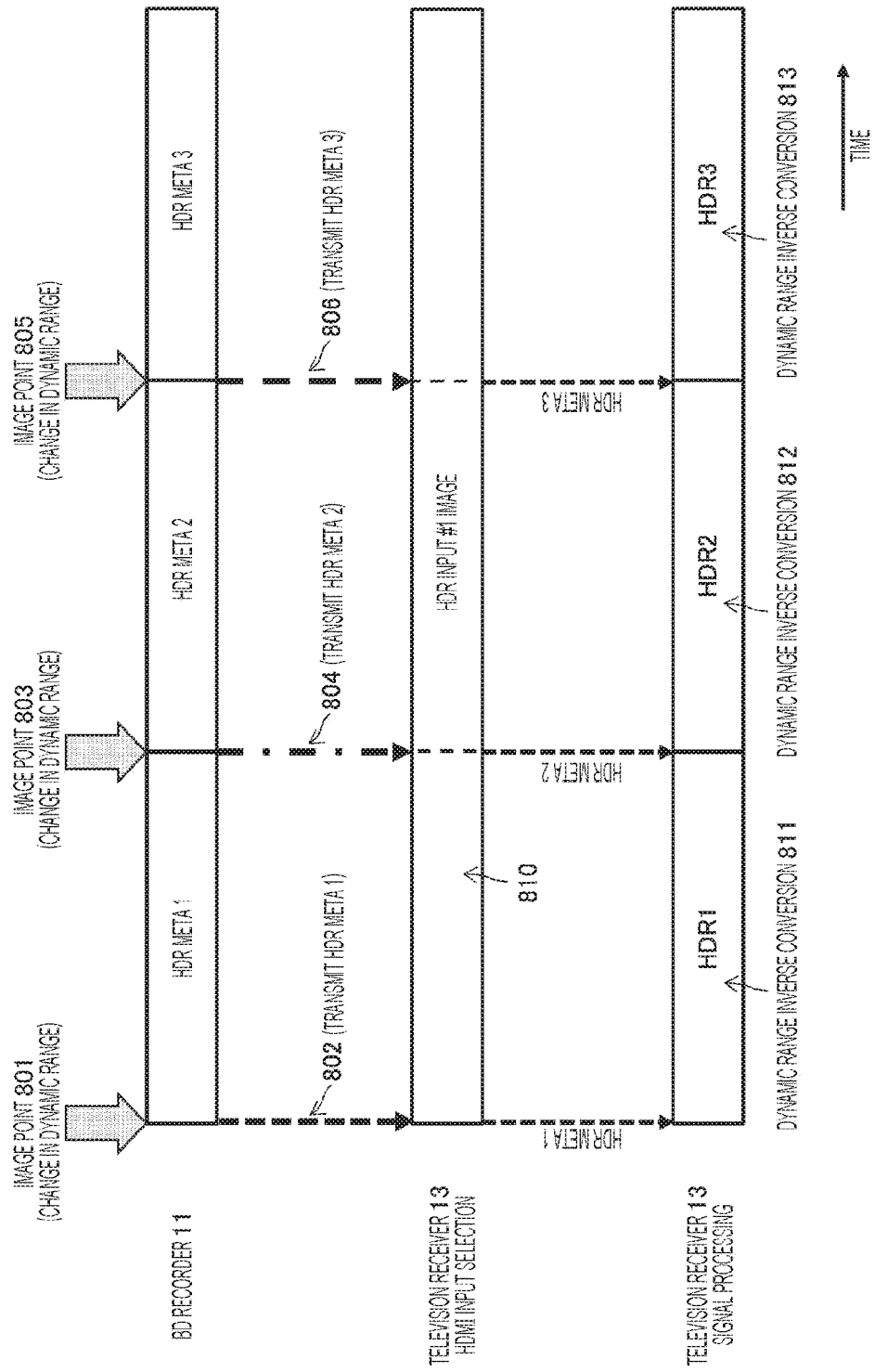
FIG. 8 is a view illustrating an example of a method of performing thinning transmission of the dynamic range conversion definition information.

In FIG. 8, an example of a method of performing thinning transmission of dynamic range conversion definition information between the BD recorder 11 (HDMI source device) and the television receiver 13 (HDMI sink device) is illustrated. The thinning transmission method of the dynamic range conversion definition information will be described with reference to FIG. 8.

When a dynamic range of uncompressed image data is changed at an image point 801, corresponding dynamic range conversion definition information (HDR meta 1) is transmitted from the information transmission unit 11d of the BD recorder 11 as indicated by a reference number 802. Similarly, when a dynamic range of the uncompressed image data is changed at an image point 803, dynamic range conversion definition information (HDR meta 2) corresponding to the mage point 803 is transmitted from the information transmission unit 11d of the BD recorder 11 as indicated by a reference number 804 and when a dynamic range of the uncompressed image data is changed at an image point 805, dynamic range conversion definition information (HDR meta 3) corresponding to the image point 805 is transmitted from the information transmission unit 11d of the BD recorder 11 as indicated by a reference number 806.

With respect to the dynamic range conversion definition information transmitted at each of the image points 801, 803, and 805, processing of repetitious transmission of the dynamic range conversion definition information can be omitted by setting of the persistence flag 603 to the high level "1" as described in FIG. 6. On the side of the television receiver 13, in a case where a persistence flag 603 of dynamic range conversion definition information received in the information reception unit 13d is set to the high level "1," the dynamic range conversion definition information is held in the storage unit 13e until next dynamic range conversion definition information is received.

Here, a description of processing on the side of the television receiver 13 will be made on the assumption that fixation to an HDMI input from the BD recorder 11 (referred to as "HDMI input #1") is kept performed on the side of the television receiver 13 as indicated by a reference number 810. When new dynamic range conversion definition information (HDR meta 1) is received in the information reception unit 13d from the BD recorder 11 at the image point 801, since a persistence flag thereof is set to the high level "1," the information is held in the storage unit 13e until next dynamic range conversion definition information is received. Also, the image signal processing circuit 204 and the graphic generation circuit 205 correctly perform dynamic range inverse conversion of image data input from the BD recorder 11 on the basis of the held dynamic range conversion definition information (HDR meta 1) and reproduce an original high luminance image (HDR1) as indicated by a reference number 811.

Then, when new dynamic range conversion definition information (HDR meta 2) is received from the BD recorder 11 at the image point 803, since a persistence flag thereof is set to the high level "1," the information is held until next dynamic range conversion definition information is received, dynamic range inverse conversion of image data input from the BD recorder 11 is correctly performed on the basis of the held dynamic range conversion definition information (HDRmeta2), and an original high luminance image (HDR2) is reproduced as indicated by a reference number 812.

Then, when new dynamic range conversion definition information (HDR meta 3) is received from the BD recorder 11 at the image point 805, since a persistence flag thereof is set to the high level "1," the information is held until next dynamic range conversion definition information is received, dynamic range inverse conversion of image data input from the BD recorder 11 is correctly performed, and an original high luminance image (HDR3) is reproduced as indicated by a reference number 813.

Figure 9:
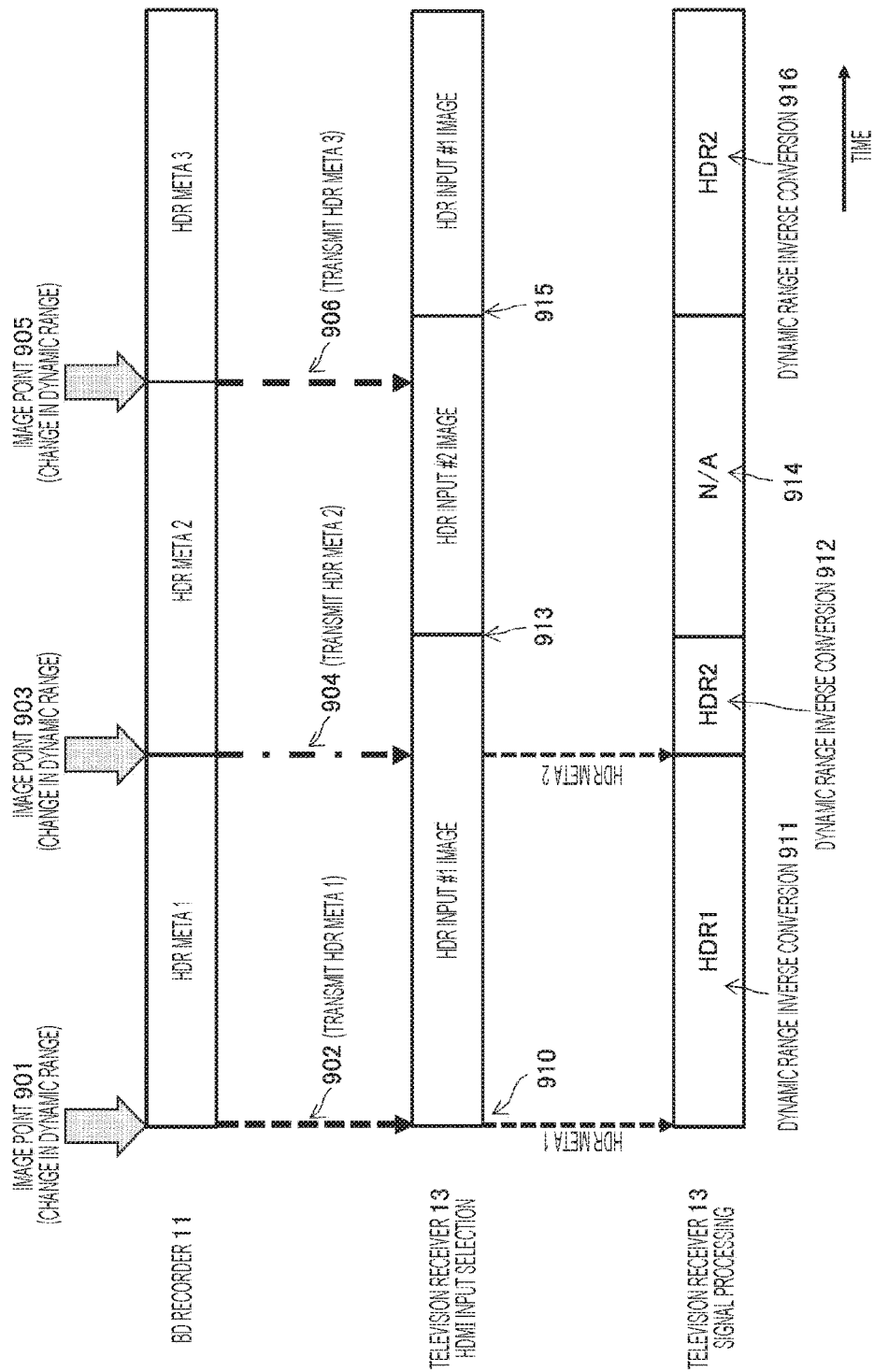
FIG. 9 is a view for describing a problem generated in a case of performing the thinning transmission of the dynamic range conversion definition information.

Then, a problem generated in thinning transmission of dynamic range conversion definition information will be described. In FIG. 9, an example of when an HDMI input switching operation of the television receiver 13 is performed between image points in which a dynamic range is changed is illustrated.

When a dynamic range is changed at image points that are respectively indicated by reference numbers 901, 903, and 905, the dynamic range conversion definition information HDR meta 1, HDR meta 2, and HDR meta 3 is transmitted from the information transmission unit 11d of the BD recorder 11 in response to each image point as indicated by reference numbers 902, 904, and 906.

On the side of the television receiver 13, switching to the HDMI input from the BD recorder 11 (referred to as "HDMI input #1") is performed at a time point of the image point 901 as indicated by a reference number 910. When new dynamic range conversion definition information (HDR meta 1) is received in the information reception unit 13d from the BD recorder 11 at the image point 901, since a persistence flag (knee_function_persistence_flag) is set to the high level "1," the television receiver 13 holds the information in the storage unit 13e until next dynamic range conversion definition information is received. Also, the image signal processing circuit 204 and the graphic generation circuit 205 correctly perform dynamic range inverse conversion of image data input from the BD recorder 11 on the basis of the dynamic range conversion definition information (HDR meta 1) held in the storage unit 13e and reproduce an original high luminance image (HDR1) as indicated by a reference number 911.

Then, when new dynamic range conversion definition information (HDR meta 2) is received from the BD recorder 11 at the image point 903, since a persistence flag thereof is set to the high level "1," the television receiver 13 holds the information until next dynamic range conversion definition information is received. Also, since the HDMI input is kept switched to the HDMI input #1 (BD recorder 11), the television receiver 13 correctly performs dynamic range inverse conversion of image data input from the BD recorder 11 on the basis of the held dynamic range conversion definition information (HDR meta 2) and reproduces an original high luminance image (HDR2) as indicated by a reference number 912.

Then, it is assumed that HDMI input switching from the HDMI input #1 (BD recorder 11) to a different HDMI input #2 (STB 12) is performed between the image point 903 and the image point 905 as indicated by a reference number 913. While switching to the HDMI input #2 is performed, signal processing of image data from the BD recorder 11 is not performed on the side of the television receiver 13 as indicated by a reference number 914 (N/A).

Then, new dynamic range conversion definition information (HDR meta 3) is transmitted from the information transmission unit 11d of the BD recorder 11 at the image point 905 as indicated by the reference number 906. However, the side of the television receiver 13 is in a period of executing signal processing of image data from the HDMI input #2 (STB 12) and it is not possible to receive the new dynamic range conversion definition information (HDR meta 3). Thus, previous dynamic range conversion definition information HDR2 is held.

Then, as indicated by a reference number 915, it is assumed that HDMI input switching is performed and switching back to image data from the HDMI input #1 (BD recorder 11) is performed. On the side of the television receiver 13, as indicated by a reference number 916, dynamic range processing is performed with the dynamic range conversion definition information HDR2 transmitted at the image point 903 and a different dynamic range image is displayed.

Then, in a technology disclosed in the present specification, a mechanism of controlling transmission of the dynamic range conversion definition information from an HDMI sink device to an HDMI source device is introduced. In a case where HDMI input switching is performed and new dynamic range conversion processing is performed, the television receiver 13 can acquire dynamic range conversion definition information of uncompressed image data at intended timing by a simple method of making a transmission request to an HDMI source device in a destination of input switching for the dynamic range conversion definition information. Accordingly, it is possible for the television receiver 13 to perform dynamic range conversion of uncompressed image data well and to constantly display an image in appropriate luminance. Also, when dynamic range conversion definition information of uncompressed image data is acquired, the television receiver 13 minimizes transmission of the dynamic range conversion definition information by giving an instruction to the HDMI sink device to stop transmission of the dynamic range conversion definition information.

Figure 10:
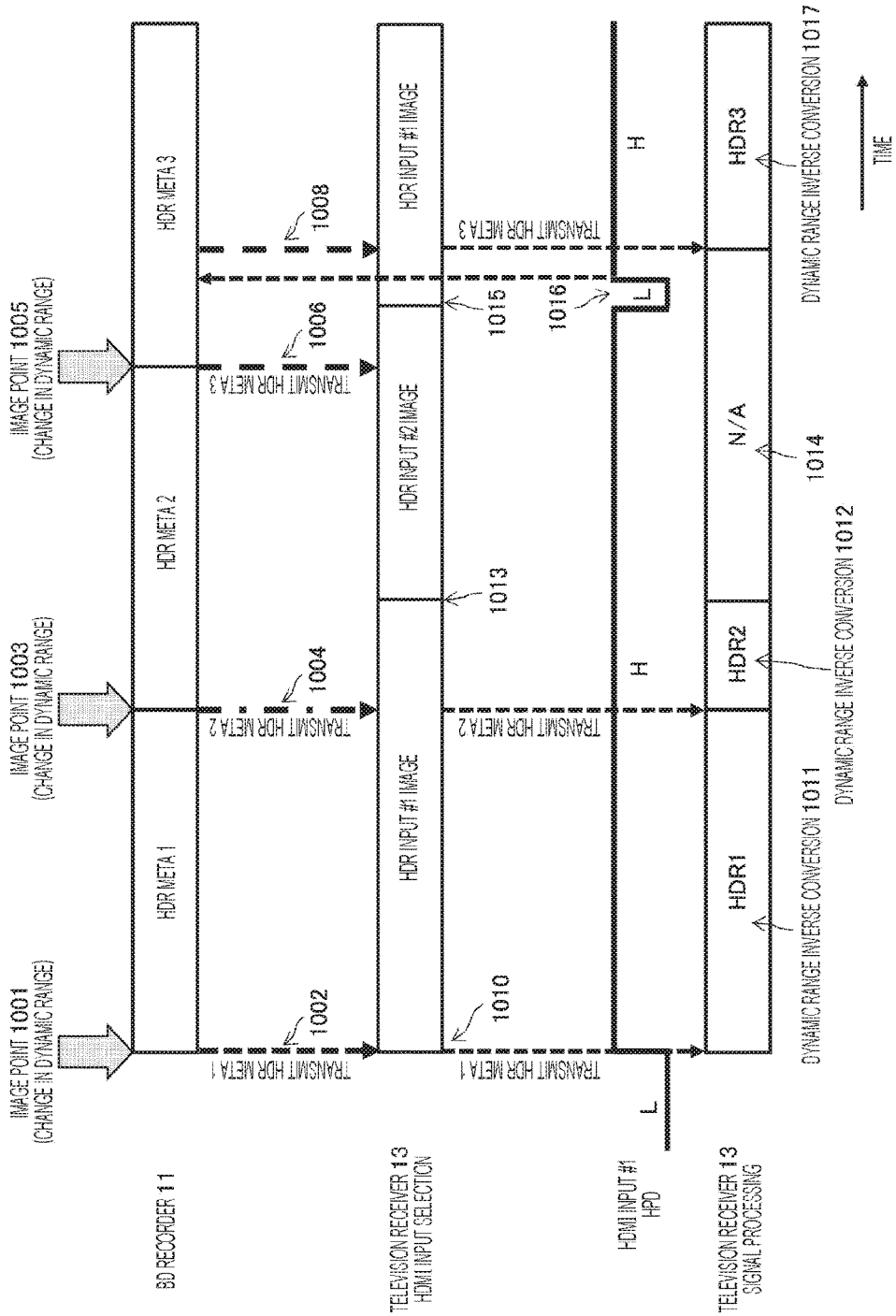
FIG. 10 is a view illustrating an example of a transmission method of dynamic range conversion definition information to which method a technology disclosed in the present specification is applied.

In FIG. 10, an example of a transmission method of dynamic range conversion definition information to which method a technology disclosed in the present specification is applied is illustrated. In the television receiver 13, transmission request information for dynamic range conversion definition information is transmitted to the HDMI source device in HDMI input switching.

When a dynamic range is changed at image points respectively indicated by reference numbers 1001, 1003, and 1005, the dynamic range conversion definition information HDR meta 1, HDR meta 2, and HDR meta 3 is transmitted from the information transmission unit 11d of the BD recorder 11 in response to each image point as indicated by reference numbers 1002, 1004, and 1006.

On the side of the television receiver 13, switching to an HDMI input from the BD recorder 11 (referred to as "HDMI input #1") is performed at a time point of the image point 1001 as indicated by a reference number 1010. As indicated by the reference number 1002, when the information reception unit 13d receives new dynamic range conversion definition information (HDR meta 1) from the BD recorder 11 at the image point 1001, since a persistence flag thereof (knee_function_persistence_flag) is set to the high level "1," the information is held in the storage unit 13e until next dynamic range conversion definition information is received. Also, the image signal processing circuit 204 and the graphic generation circuit 205 correctly perform dynamic range inverse conversion of image data input from the BD recorder 11 on the basis of the dynamic range conversion definition information (HDR meta 1) held in the storage unit 13e and reproduce an original high luminance image (HDR1) as indicated by a reference number 1011.

Then, as indicated by the reference number 1004, when the information reception unit 13*d* receives new dynamic range conversion definition information (HDR meta 2) from the BD recorder 11 at the image point 1003, since a persistence flag thereof is set to the high level "1," the information is held in the storage unit 13*e* until next dynamic range conversion definition information is received. Also, since the HDMI input is kept switched to the HDMI input #1 (BD recorder 11), the image signal processing circuit 204 and the graphic generation circuit 205 correctly perform dynamic range inverse conversion of image data input from the BD recorder 11 on the basis of the dynamic range conversion definition information (HDR meta 2) held in the storage unit 13*e* and reproduce an original high luminance image (HDR2) as indicated by a reference number 1012.

Then, it is assumed that HDMI input switching from the HDMI input #1 (BD recorder 11) to a different HDMI input #2 (STB 12) is performed on the side of the television receiver 13 between the image point 1003 and the image point 1005 as indicated by a reference number 1013. While switching to the HDMI input #2 is performed, signal processing of image data from the BD recorder 11 is not performed on the side of the television receiver 13 as indicated by a reference number 1014 (N/A).

Then, new dynamic range conversion definition information (HDR meta 3) is transmitted from the BD recorder 11 at the image point 1005 as indicated by the reference number 1006. However, the side of the television receiver 13 is in a period of executing signal processing of image data from the HDMI input #2 (STB 12) and it is not possible to receive the new dynamic range conversion definition information (HDR meta 3). Thus, previous dynamic range conversion definition information HDR2 is held in the storage unit 13*e*.

Then, as indicated by a reference number 1015, it is assumed that HDMI input switching is performed and switching back to the image data from the HDMI input #1 (BD recorder 11) is performed. Here, the television receiver 13 makes a transmission request to the BD recorder 11, which is a destination of HDMI input switching, for the dynamic range conversion definition information. More specifically, as indicated by a reference number 1016, the control transmission unit 13*c* makes the HPD line 35 of the HDMI terminal 13*a* a low level "L" only for a certain period and subsequently performs control into a high level "H" on the side of the television receiver 13. On the other hand, on the side of the BD recorder 11, when a rising edge of the HPD line 35 is detected with the control reception unit 11*c*, in a case where it is determined that transmission control of the dynamic range conversion definition information is performed in the television receiver 13, dynamic range conversion definition information (HDR meta 3) that is identical to what is transmitted at the image point 1015 is transmitted from the information transmission unit 11*d* as indicated by a reference number 1008. Then, on the side of the television receiver 13, dynamic range conversion processing is performed by utilization of the dynamic range conversion definition information (HDR meta 3) that is transmitted again, as indicated by a reference number 1017.

In such a manner, by performing the control of the HPD line 35, which control is indicated by the reference number 1016, with the control transmission unit 13*c*, the television receiver 13 can acquire appropriate dynamic range conversion definition information (HDR meta 3) after the HDMI input switching 1015, can correctly perform dynamic range inverse conversion with respect to an input image, and can reproduce an original high luminance image (HDR3) well.

Figure 11:
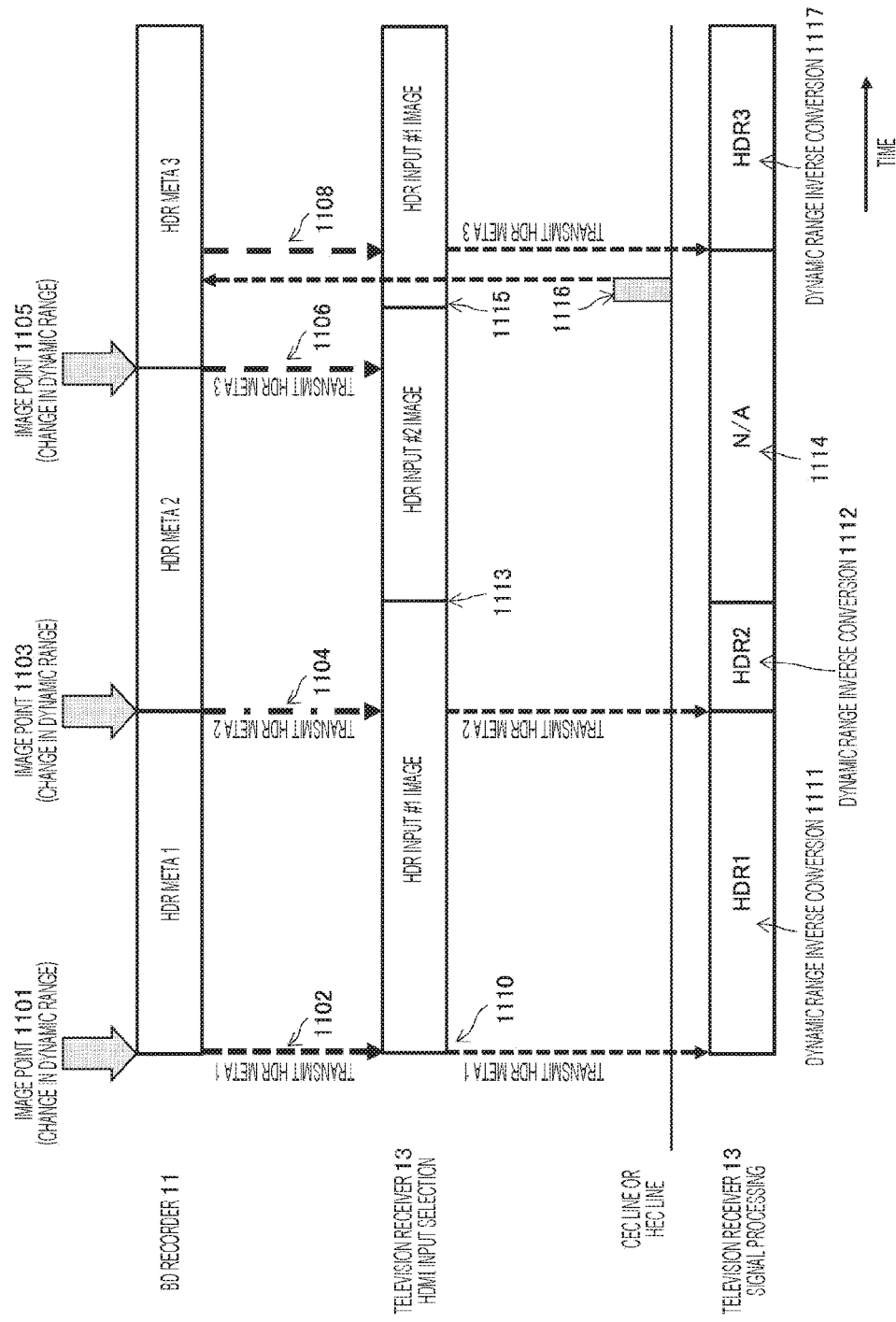
FIG. 11 is a view illustrating a different example of a transmission method of dynamic range conversion definition information to which method a technology disclosed in the present specification is applied.

Also, in FIG. 11, a different example of a transmission method of dynamic range conversion definition information to which method a technology disclosed in the present specification is applied is illustrated. In the drawing, the television receiver 13 also transmits transmission request information for dynamic range conversion definition information to an HDMI source device in HDMI input switching. In the example illustrated in FIG. 10, the control transmission unit 13*c* of the television receiver 35 transmits transmission request information for dynamic range conversion definition information by performing control of the HPD line 35 of the HDMI terminal 13*a*. On the other hand, in the example illustrated in FIG. 11, the control transmission unit 13*c* of the television receiver 13 performs transmission request control of dynamic range conversion definition information through the CEC line 34 or a bi-directional communication path (HEC line), which includes a pair of differential transmission paths using the HPD/Ether+ line 35 and the reserve/Ether− line 37, of the HDMI terminal 13*a*.

When a dynamic range is changed at image points respectively indicated by reference numbers 1101, 1103, and 1105, the dynamic range conversion definition information HDR meta 1, HDR meta 2, and HDR meta 3 is transmitted from the information transmission unit 11*d* of the BD recorder 11 in response to each image point as indicated by reference numbers 1102, 1104, and 1106.

On the side of the television receiver 13, switching to an HDMI input from the BD recorder 11 (referred to as "HDMI input #1") is performed at a time point of the image point 1101 as indicated by a reference number 1110. As indicated by the reference number 1102, when new dynamic range conversion definition information (HDR meta 1) is received in the information reception unit 13*d* from the BD recorder 11 at the image point 1101, since a persistence flag thereof (knee_function_persistence_flag) is set to the high level "1," the information is held in the storage unit 13*e* until next dynamic range conversion definition information is received. Also, the image signal processing circuit 204 and the graphic generation circuit 205 correctly perform dynamic range inverse conversion of image data input from the BD recorder 11 on the basis of the dynamic range conversion definition information (HDR meta 1) held in the storage unit 13*e* and reproduce an original high luminance image (HDR1) as indicated by a reference number 1111.

Then, as indicated by the reference number 1104, when new dynamic range conversion definition information (HDR meta 2) is received from the BD recorder 11 at the image point 1103, since a persistence flag thereof is set to the high level "1," the television receiver 13 holds the information until next dynamic range conversion definition information is received. Also, since the HDMI input is kept switched to the HDMI input #1 (BD recorder 11), the television receiver 13 correctly performs dynamic range inverse conversion of image data input from the BD recorder 11 on the basis of the held dynamic range conversion definition information (HDR meta 2) and reproduces an original high luminance image (HDR2) as indicated by a reference number 1112.

Then, it is assumed that HDMI input switching from the HDMI input #1 (BD recorder 11) to a different HDMI input #2 (STB 12) is performed on the side of the television receiver 13 between the image point 1103 and the image point 1105 as indicated by a reference number 1113. While switching to the HDMI input #2 is performed, signal processing of image data from the BD recorder 11 is not performed on the side of the television receiver 13 as indicated by a reference number 1114 (N/A).

Then, new dynamic range conversion definition information (HDR meta 3) is transmitted from the BD recorder 11 at the image point 1105 as indicated by the reference number 1106. However, the side of the television receiver 13 is in a period of executing signal processing of image data from the HDMI input #2 (STB 12) and it is not possible to receive the new dynamic range conversion definition information (HDR meta 3). Thus, previous dynamic range conversion definition information HDR2 is held in the storage unit 13*e*.

Then, as indicated by a reference number 1115, it is assumed that HDMI input switching is performed and switching back to the image data from the HDMI input #1 (BD recorder 11) is performed. Here, the television receiver 13 makes a transmission request to the BD recorder 11, which is a destination of HDMI input switching, for the dynamic range conversion definition information. More specifically, as indicated by a reference number 1116, on the side of the television receiver 13, the control transmission unit 13*c* transmits a transmission request command for dynamic range conversion definition information through the CEC line 34 or the bi-directional communication path, which includes the HPD/Ether+ line 35 and the reserve/Ether− line 37, of the HDMI terminal 13*a*. When the transmission request command for the dynamic range conversion definition information is received in the control reception unit 11*c* through the CEC line 34 or the bi-directional communication path, the BD recorder 11 transmits dynamic range conversion definition information (HDR meta 3) that is identical to what is transmitted at the image point 1015 from the information transmission unit 11*d* as indicated by a reference number 1108. The television receiver 13 can correctly perform dynamic range conversion processing by using the dynamic range conversion definition information (HDR meta 3) that is transmitted again, as indicated by a reference number 1117.

In such a manner, by performing transmission control of a command which control is indicated by the reference number 1116, the television receiver 13 can acquire appropriate dynamic range conversion definition information (HDR meta 3) after the HDMI input switching 1115, can correctly perform dynamic range inverse conversion with respect to an input image, and can reproduce an original high luminance image (HDR3) well.

Figure 12:
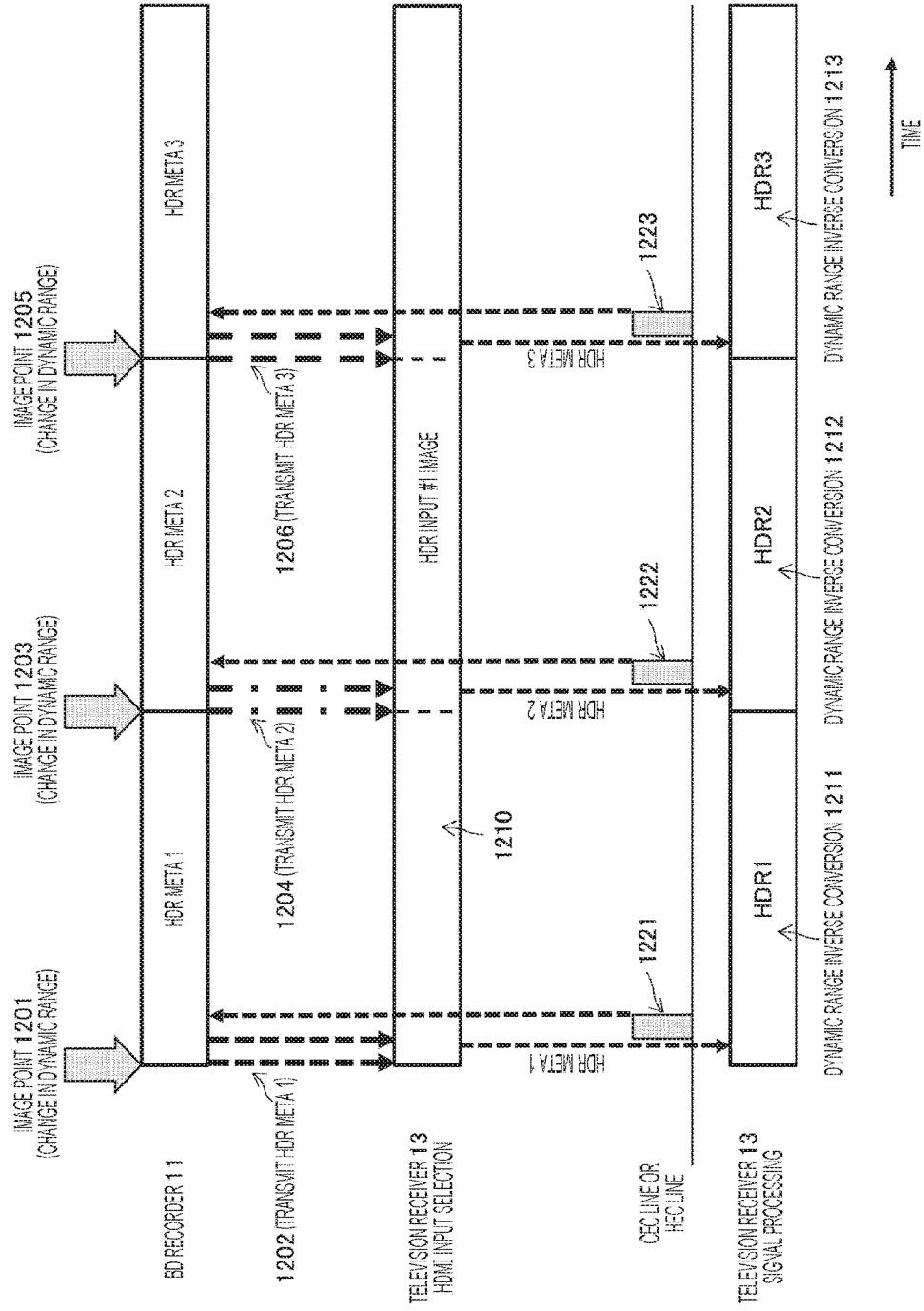
FIG. 12 is a view illustrating a different example of a transmission method of dynamic range conversion definition information to which method a technology disclosed in the present specification is applied.

Also, in FIG. 12, a different example of a transmission method of dynamic range conversion definition information to which method a technology disclosed in the present specification is applied is illustrated. In FIG. 7, a method of constantly transmitting dynamic range conversion definition information at regular intervals is illustrated. On the other hand, in FIG. 12, in order to reduce transmission capacity of a transmission path, transmission control of dynamic range conversion definition information by transmission of reception recognition information of dynamic range conversion definition information is performed through a CEC line 34 or a bi-directional communication path, which includes an HPD/Ether+ line 35 and a reserve/Ether− line 37, of an HDMI terminal 13*a* of a television receiver 35.

Here, a description will be made on the assumption that fixation to an HDMI input from the BD recorder 11 (referred to as "HDMI input #1") is kept performed on the side of the television receiver 13 as indicated by a reference number 1210. While a reproduced image is transmitted to the transmission path (HDMI cable 14-1), the BD recorder 11 starts repetitious transmission of corresponding dynamic range conversion definition information (HDR meta 1) as indicated by a reference number 1202 with an image point 1201, at which a dynamic range of uncompressed image data is changed, as a starting point.

On the side of the television receiver 13, when the dynamic range conversion definition information (HDR meta 1) is correctly received in the information reception unit 13*d*, the image signal processing circuit 204 and the graphic generation circuit 205 correctly perform dynamic range inverse conversion of image data input from the BD recorder 11 and reproduce an original high luminance image (HDR1) as indicated by a reference number 1211.

Also, on the side of the television receiver 13, when the dynamic range conversion definition information (HDR meta 1) is correctly received, the control transmission unit 13*c* transmits reception recognition information of the dynamic range conversion definition information through the CEC line 34 or the bi-directional communication path (HEC line), which includes the HPD/Ether+ line 35 and the reserve/Ether− line 37, of the HDMI terminal 13*a* as indicated by a reference number 1221.

Then, on the side of the BD recorder 11, when the reception recognition information of the dynamic range conversion definition information is received in the control reception unit 11*c*, transmission of the dynamic range conversion definition information (HDR meta 1) from the information transmission unit 11*d* is stopped.

Also, as indicated by a reference number 1204, the BD recorder 11 starts repetitious transmission of corresponding dynamic range conversion definition information (HDR meta 2) with an image point 1203, at which a dynamic range of the uncompressed image data is subsequently changed, as a starting point.

On the side of the television receiver 13, when the dynamic range conversion definition information (HDR meta 2) is correctly received in the information reception unit 13*d*, dynamic range inverse conversion of image data input from the BD recorder 11 is correctly performed and an original high luminance image (HDR2) is reproduced as indicated by a reference number 1212.

Also, as indicated by a reference number 1222, on the side of the television receiver 13, the control transmission unit 13*c* transmits reception recognition information of the dynamic range conversion definition information through the CEC line 34 or the bi-directional communication path (HEC line). Then, on the side of the BD recorder 11, when the reception recognition information of the dynamic range conversion definition information is received in the control reception unit 11*c*, transmission of the dynamic range conversion definition information (HDR meta 2) from the information transmission unit 11*d* is stopped.

Also, as indicated by a reference number 1206, the BD recorder 11 starts repetitious transmission of corresponding dynamic range conversion definition information (HDR meta 3) with an image point 1205, at which a dynamic range of the uncompressed image data is subsequently changed, as a starting point.

On the side of the television receiver 13, when the dynamic range conversion definition information (HDR meta 3) is correctly received in the information reception unit 13*d*, dynamic range inverse conversion of image data input from the BD recorder 11 is correctly performed and an original high luminance image (HDR3) is reproduced as indicated by a reference number 1213.

Also, as indicated by a reference number 1223, on the side of the television receiver 13, the control transmission unit 13*c* transmits reception recognition information of the dynamic range conversion definition information from the control transmission unit 13*c* through the CEC line 34 or the bi-directional communication path (HEC line). Then, on the side of the BD recorder 11, when the reception recognition information of the dynamic range conversion definition information is received in the control reception unit 11c, transmission of the dynamic range conversion definition information (HDR meta 3) from the information transmission unit 11d is stopped.

In such a manner, by transmission control of dynamic range conversion definition information based on transmission of reception recognition information from the television receiver 13, it is possible to omit transmission of unnecessary dynamic range conversion definition information on a side of an HDMI source device such as the BD recorder 11 and to reduce transmission capacity of a transmission path.

[Data Structure Example of CEC Packet]

In the CEC line 34, it is possible to transmit transmission control information such as transmission request information or reception recognition information of dynamic range conversion definition information between an HDMI source device and an HDMI sink device although synchronization with uncompressed image data is not possible due to a low transmission rate.

Figure 13:
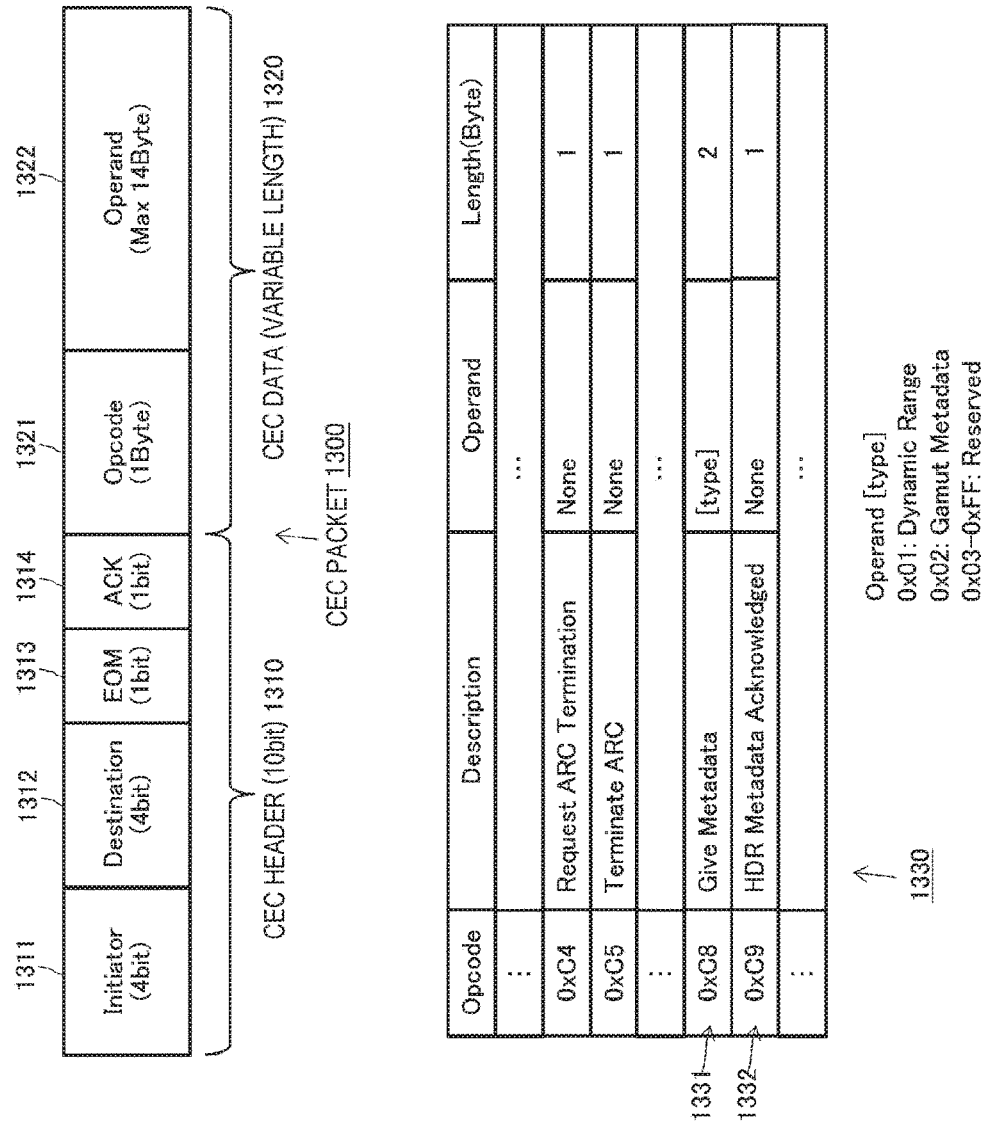
FIG. 13 is a view illustrating a data structure example of a CEC packet.

In FIG. 13, a data structure example of a CEC packet 1300 transmitted between the HDMI source device and the HDMI sink device through the CEC line 34 is illustrated. As illustrated in an upper part in FIG. 13, the CEC packet 1300 includes a 10-bit CEC header 1310 and CEC data 1320 with a variable length. In the AV system 10 illustrated in FIG. 1, the control transmission unit 13c on the side of the television receiver 13 transmits a CEC packet and the control reception unit 11c on the side of the BD recorder 11 performs reception.

The CEC header 1310 includes a 4-bit CEC address of a transmission source (Initiator) 1311, a 4-bit CEC address of a transmission destination (Destination) 1312, a 1-bit end of message (EOM) 1313, and 1-bit acknowledge (ACK) 1314. After the CEC header 1310, the CEC data 1320 is configured from a 1-byte control code (Opcode) 1321 and a control data part (Operand) 1322 having 14 bytes at maximum.

In the control data part (Operand) 1322 of the CEC packet 1300, an HDMI CEC command is stored. In a lower part in FIG. 13, an extension example 1330 of the HDMI CEC command is illustrated. In the present embodiment, in a case where "0xC8" is newly assigned to a control code (Opcode) of the CEC as a transmission control command of metadata as indicated by a reference number 1331 and dynamic range conversion definition information is requested, "0x01" is set to an operand (type). Also, in the present embodiment, as indicated by a reference number 1332, "0xC9" is newly assigned as a reception recognition command of metadata. When a control data part with a response command being "Abort" is returned with respect to the transmission control command transmitted to the BD recorder 11, the television receiver 13 determines that there is no dynamic range conversion definition information and does not perform dynamic range conversion processing.

[Data Structure Example of HEC Line]

As described above, it is possible to configure a bi-directional communication path that can perform high-speed LAN communication, that is, an HEC line by using a pair of differential transmission paths including the HPD/Ether+ line 35 and the reserve/Ether− line 37 between the HDMI source device and the HDMI sink device. Through this HEC line, it is possible to transmit transmission control information such as transmission request information or reception recognition information of dynamic range conversion definition information between the HDMI source device and the HDMI sink device. Also, the HEC line is at high speed and can transmit dynamic range conversion definition information in synchronization with uncompressed image data.

Figure 14:
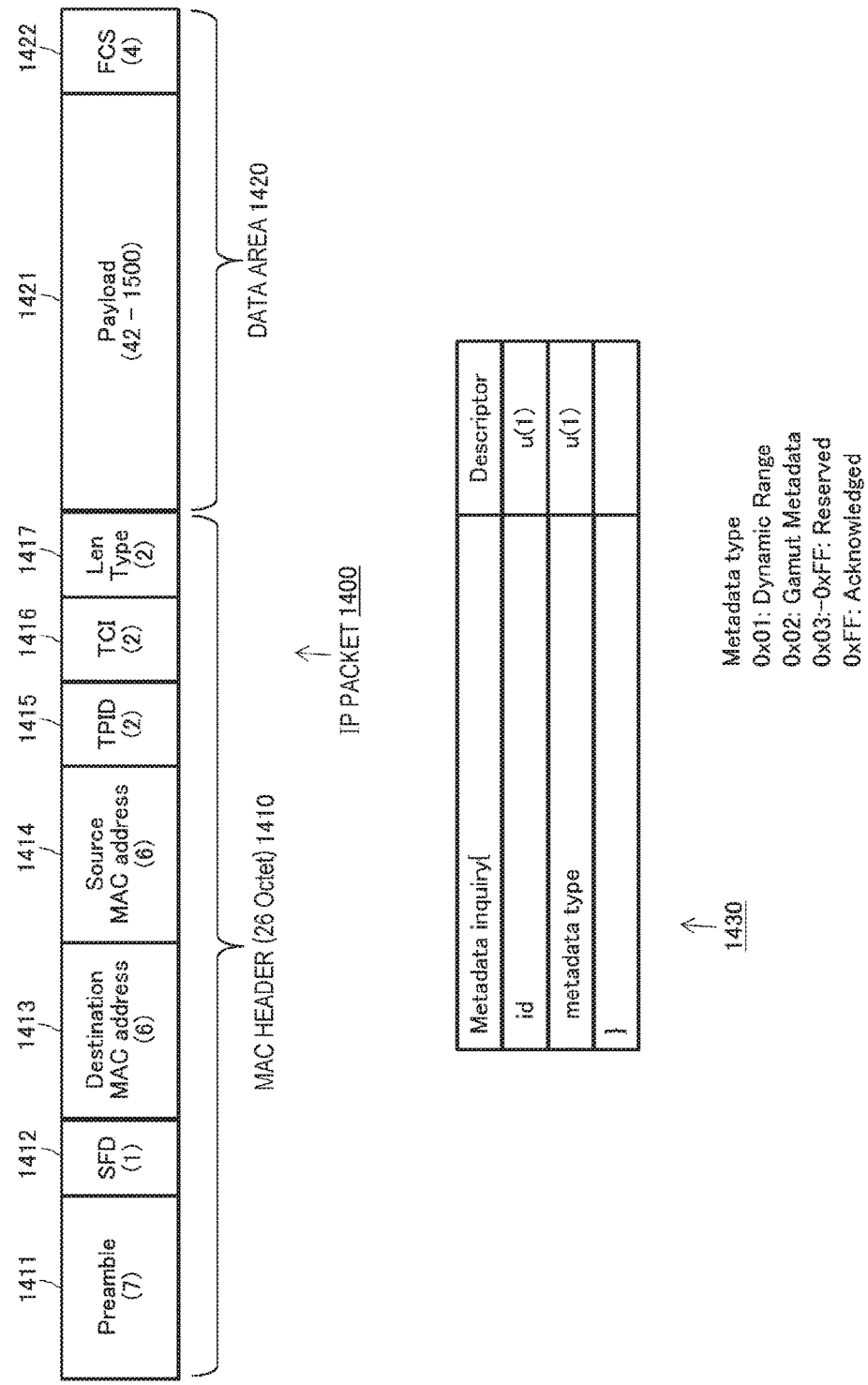
FIG. 14 is a view illustrating a data structure example of a bi-directional communication path.

In FIG. 14, a data structure example of an IP packet 1400 transmitted through an HEC line between the HDMI source device and the HDMI sink device is illustrated. As illustrated in an upper part in FIG. 14, the IP packet 1400 includes a 26-octet MAC header 1410 and a data area 1420 with a variable length. In the AV system 10 illustrated in FIG. 1, the control transmission unit 13c on the side of the television receiver 13 transmits the IP packet and the control reception unit 11c on the side of the BD recorder 11 performs reception.

The MAC header 1410 includes a 7-octet preamble part (Preamble) 1411, a 1-octet start frame delimiter (SFD) 1412, a 6-octet address of a transmission destination (Destination MAC address) 1413, a 6-octet address of a transmission source (Source MAC address) 1414, a 2-octet tag protocol identifier (TPID) 1415, 2-octet tag control information (TCI) 1416, and a 2-octet data length type (Len Type) 1417. After the MAC header 1410, the data area 1420 is configured from a payload part (Payload) 1421 having 42 octets to 1500 octets and a 4-octet frame check sequence (FCS) 1422.

Transmission control information such as transmission request information or reception recognition information of dynamic range conversion definition information is inserted into a data area 1421 of a payload part 1420. In a lower part in FIG. 14, a data structure example of transmission control information 1430 according to an IP packet is illustrated. A first byte of the transmission control information 1430 is identification information (id) indicating transmission control information. For example, identification information indicating a transmission request command is set. Then, a type of metadata of requested transmission control (metadata type) is set. It is possible to set metadata of dynamic range conversion definition information to 0x01 and to make a transmission request for metadata other than the dynamic range conversion definition information (such as gamma definition information) by using an IP packet. Also, a reception recognition command of the dynamic range conversion definition information may be set with identification information (id) different from that of a transmission request command or a method of setting a different type of metadata (metadata type) (such as 0xFF) by using identification information (id) identical to that of the transmission control command may be used.

[Transmission Processing of Dynamic Range Conversion Definition Information in HDMI Source Device]

Figure 15:
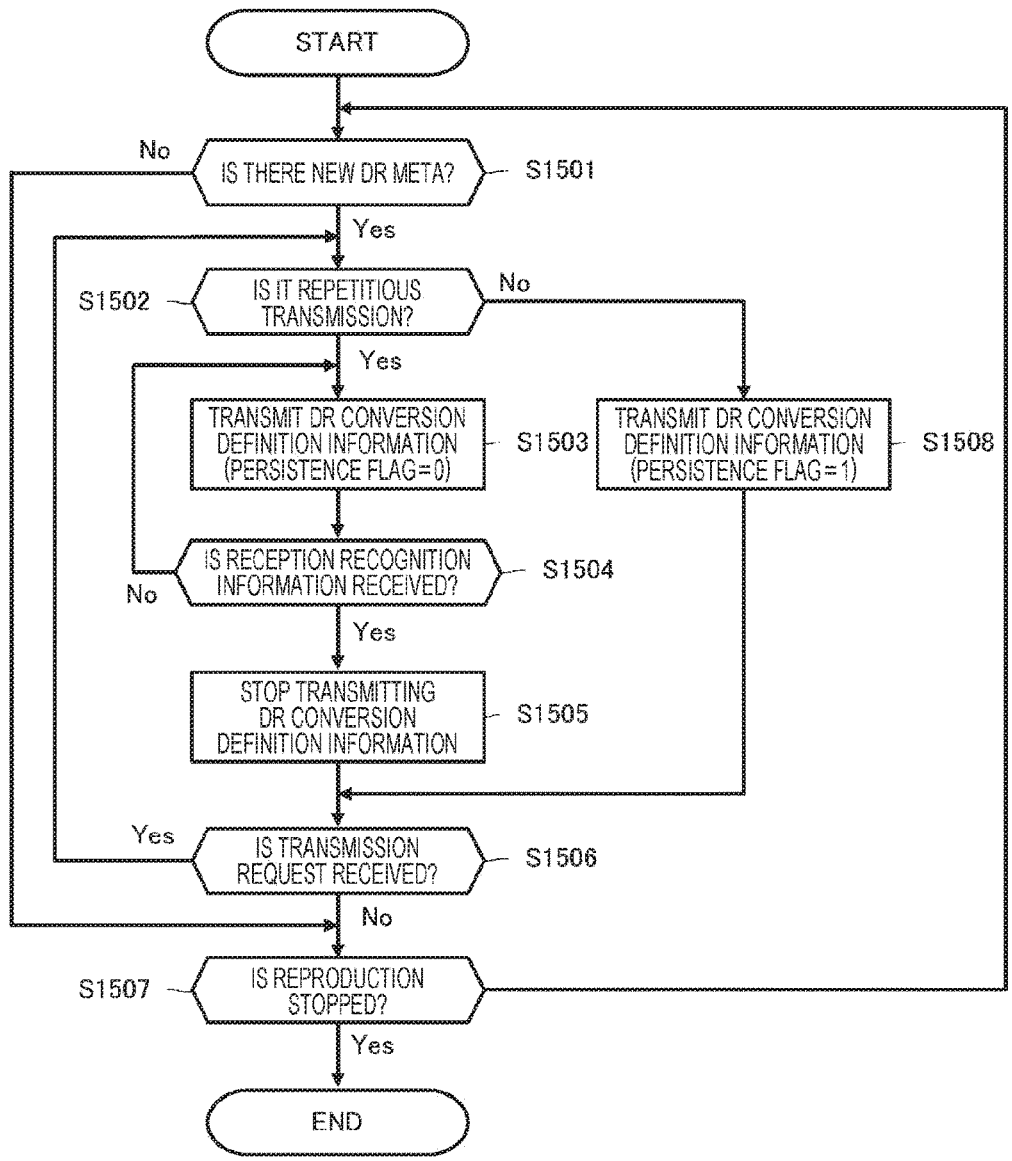
FIG. 15 is a flowchart illustrating a processing procedure to perform transmission control of the dynamic range conversion definition information in the BD recorder 11.

In FIG. 15, a processing procedure to perform transmission control of dynamic range conversion definition information in the BD recorder 11 as an HDIM source device is illustrated in a format of a flowchart. This processing procedure can be realized, for example, in a form in which the CPU 101 executes a predetermined program code.

The BD recorder 11 starts the present processing when an instruction for starting content reproduction is given by operation of a user. First, the BD recorder 11 determines whether there is dynamic range conversion definition information (DR meta) in uncompressed image data decoded from the storage medium 11f of itself (step S1501).

Here, when there is no dynamic range conversion definition information (No in step S1501), the BD recorder 11 skips the following processing and goes to step S1507.

On the other hand, when there is the dynamic range conversion definition information (Yes in step S1501), the BD recorder 11 determines whether a transmission method of the dynamic range conversion definition information is a repetitious transmission method (step S1502).

Here, when the transmission method of the dynamic range conversion definition information is single (No in step S1502), the BD recorder 11 goes to step S1508. Then, the BD recorder 11 transmits dynamic range conversion definition information in which a persistence flag (knee_function_persistence_flag) is set to the high level "1" from the information transmission unit 11d to the television receiver 13 as an HDMI sink device (step S1508) and goes to step S1506.

Also, when the transmission method of the dynamic range conversion definition information is the repetitious transmission method (Yes in step S1502), the BD recorder 11 transmits dynamic range conversion definition information in which a persistence flag (knee_function_persistence_flag) is set to the low level "0" from the information transmission unit 11d to the television receiver 13 (step S1503).

Then, the BD recorder 11 determines whether the control reception unit 11c receives reception recognition information (ACK) from the television receiver 13 (step S1504). When the reception recognition information is not received from the television receiver 13 (No in step S1504), the BD recorder 11 goes back to step S1503 and repeatedly transmits the dynamic range conversion definition information.

When the reception recognition information is received in the control reception unit 11c from the television receiver 13 (Yes in step S1504), the BD recorder 11 determines that the television receiver 13 correctly receives the dynamic range conversion definition information, and stops transmission of the dynamic range conversion definition information (step S1505).

Then, the BD recorder 11 determines whether transmission request information is received in the control reception unit 11c from the television receiver 13 (step S1506). When the transmission request information is received (Yes in step S1506), the BD recorder 11 goes back to step S1502 and transmits the dynamic range conversion definition information to the television receiver 13 again.

Also, when the BD recorder 11 does not receive the transmission request information from the television receiver 13 (No in step S1506), the BD recorder 11 determines whether reproduction of content is stopped by operation of a user (step S1507). When the reproduction is not stopped (No in step S1507), the BD recorder 11 goes back to step S1501 and repeatedly determines whether there is new dynamic range conversion definition information. Also, when the reproduction is stopped (Yes in step S1507), the BD recorder 11 immediately ends the present processing routine.

In such a manner, since the BD recorder 11 transmits dynamic range conversion definition information in response to reception of transmission request information from the television receiver 13, it is possible to acquire dynamic range conversion definition information at intended timing, to perform dynamic range conversion of uncompressed image data well, and to constantly display an image in appropriate luminance on the side of the television receiver 13.

Also, when receiving reception recognition information from the television receiver 13, the BD recorder 11 can omit transmission of unnecessary dynamic range conversion definition information and can reduce transmission capacity of a transmission path.

[Transmission Processing of Dynamic Range Conversion Definition Information in HDMI Sink Device]

Figure 16:
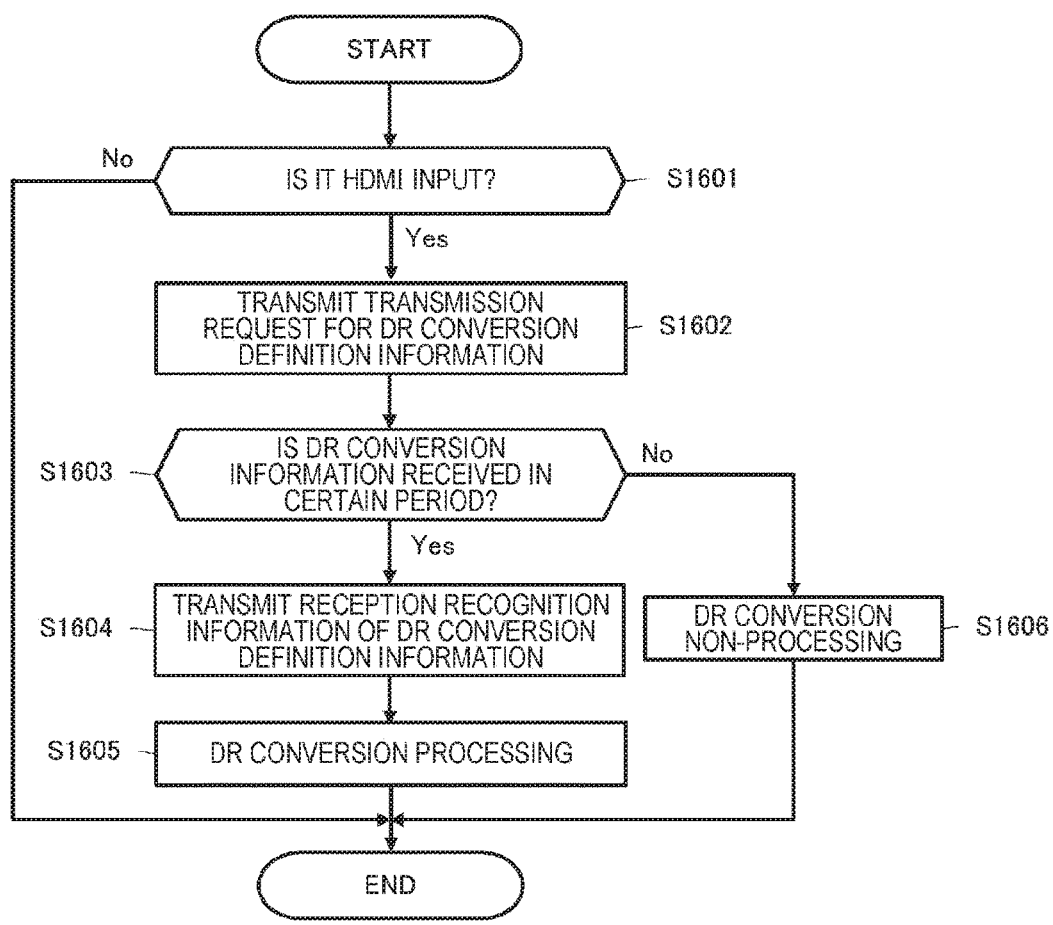
FIG. 16 is a flowchart illustrating a processing procedure to perform transmission control of the dynamic range conversion definition information in the television receiver 13.

In FIG. 16, a processing procedure to perform transmission control of dynamic range conversion definition information in the television receiver 13 as an HDMI sink device is illustrated in a format of a flowchart.

The television receiver 13 starts the present processing routine in response to detection of execution of HDMI input switching. First, the television receiver 13 determines whether an input switched in an input switching operation is an HDMI input (step S1601). When the input is not the HDMI input (No in step S1601), the television receiver 13 immediately ends the present processing routine.

On the other hand, when the switched input is the HDMI input (Yes in step S1601), the television receiver 13 transmits transmission request information for dynamic range conversion definition information from the control transmission unit 13c to the BD recorder 11 that is the HDMI input (step S1602). Here, the television receiver 13 arbitrarily selects, as a transmission method of a transmission request, any of the HPD line 35, the CEC line 34, and the bi-directional communication path (HEC line) including the HPD/Ether+ line 35 and the reserve/Ether– line 37.

Then, the television receiver 13 waits for reception of the dynamic range conversion definition information from the BD recorder 11 for a certain period (step S1603).

When the dynamic range conversion definition information is not received from the BD recorder 11 in the certain period (No in step S1603), since it is not possible to receive the dynamic range conversion definition information, the television receiver 13 determines that dynamic range conversion is not necessary, performs processing in which dynamic range conversion is not performed with respect to uncompressed image data received from the BD recorder 11 (step S1606), and immediately ends the present processing routine.

Also, when it is possible to receive the dynamic range conversion definition information in the information reception unit 13d from the BD recorder 11 in the certain period (Yes in step S1603), the television receiver 13 transmits reception recognition information of the dynamic range conversion definition information from the control transmission unit 13c to the BD recorder 11 (step S1604).

Then, after performing dynamic range conversion processing with respect to the uncompressed image data received from the BD recorder 11 on the basis of the received dynamic range conversion definition information (step S1605), the television receiver 13 immediately ends the present processing routine.

In such a manner, when the HDMI input switching is performed and new dynamic range conversion processing is performed, the television receiver 13 can acquire dynamic range conversion definition information of uncompressed image data at intended timing by a simple method of transmitting transmission request information to an HDMI source device in a destination of input switching. Accordingly, it is possible for the television receiver 13 to perform dynamic range conversion of uncompressed image data well and to constantly display an image in appropriate luminance.

Also, according to a technology disclosed in the present specification, when it is possible to acquire dynamic range conversion definition information of uncompressed image data, the television receiver 13 can minimize transmission of the dynamic range conversion definition information from the BD recorder 11 by sending reception recognition information back.

That is, according to a technology disclosed in the present specification, the television receiver 13 can acquire dynamic range conversion definition information of uncompressed image data at intended timing by transmitting transmission control information of the dynamic range conversion definition information to the BD recorder 11 and can reduce transmission capacity of a transmission path by omitting transmission of unnecessary dynamic range conversion definition information from the BD recorder 11.

[Modification Example]

A technology disclosed in the present specification has been described with an embodiment including the AV system 10 in which the BD recorder 11 as an HDMI source device and the television receiver 13 as an HDMI sink device are connected to each other through each HDMI cable 14-1 (see FIG. 1) as an example. However, the spirit of the technology disclosed in the present technology is not limited to this. Similarly, the television receiver 13 can acquire dynamic range conversion definition information of uncompressed image data at intended timing by transmitting transmission control information (transmission request information or reception recognition information) of the dynamic range conversion definition information to the STB 12 connected through the HDMI cable 14-2 and can reduce transmission capacity of a transmission path by omitting transmission of unnecessary dynamic range conversion definition information from the STB 12.

Also, similarly, with respect to content on the Internet connected through the wireless transmission/reception unit 217, the television receiver 13 can acquire dynamic range conversion definition information of uncompressed image data at intended timing by transmitting transmission control information (transmission request information and reception recognition information) of the dynamic range conversion definition information according to the IP data structure illustrated in a lower part in FIG. 14 and can reduce transmission capacity of a wireless transmission path by omitting transmission of unnecessary dynamic range conversion definition information from a content server on the Internet.

Also, similarly, instead of an HDMI source device such as the BD recorder 11 or the STB 12, with respect to an HDMI repeater device (such as AV amplifier: not illustrated) placed between the television receiver 13 and the HDMI source device, the television receiver 13 as an HDMI sink device can acquire dynamic range conversion definition information of uncompressed image data at intended timing by transmitting transmission control information of the dynamic range conversion definition information and can control transmission of unnecessary dynamic range conversion definition information.

[Structure Example of DP System]

Figure 17:
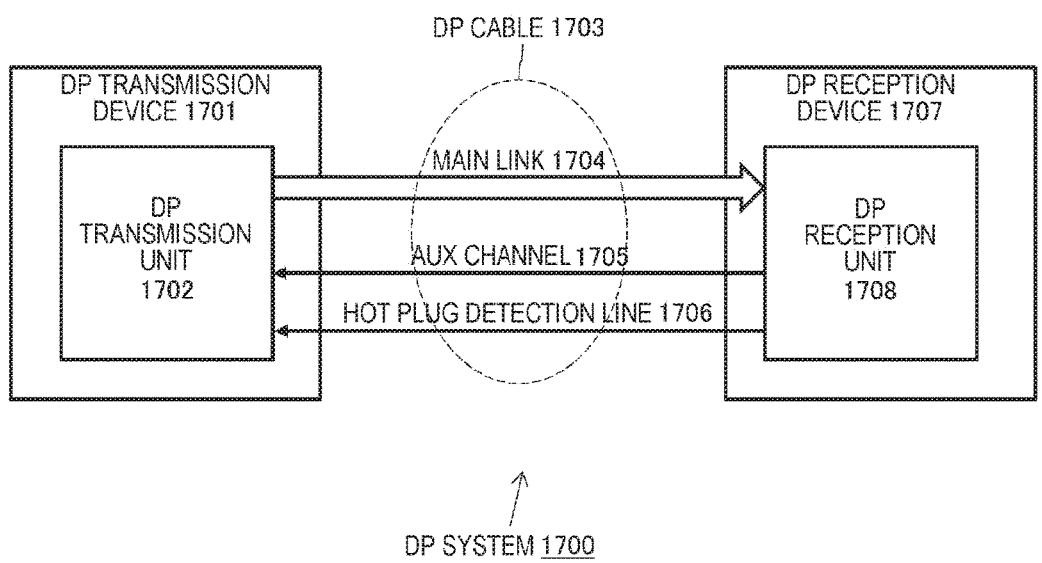
FIG. 17 is a view illustrating a configuration example of a DP system 1700 using a DP interface.

In FIG. 17, a configuration example of a DP system. 1700 using a DP interface is illustrated. The illustrated DP system 1700 includes a DP transmission device 1701 and a DP reception device 1707. The DP transmission device 1701 includes a DP transmission unit 1702. The DP reception device 1707 includes a DP reception unit 1708. The DP transmission unit 1702 and the DP reception unit 1708 are connected to each other by a DP cable 1703.

The DP cable 1703 includes a main link 1704, an AUX channel 1705, and a hot plug detection line 1706. The DP transmission device 1701 transmits packetized data to the DP reception device 1707 through the main link 1704. Also, the DP reception device 1707 performs connection control or device control with respect to the DP transmission device 1701 through the AUX channel 1705. Also, the DP reception device 1701 can detect connection of the DP transmission device 1701 with DC bias potential by using the hot plug detection line 1706. The main link 1704 includes one, two, or four double-terminal differential signal pairs (pair lane) and does not include a special clock signal. Instead, a clock is embedded in an 8B/10B encoded data stream.

In this DP interface, unlike an HDMI, a transmission speed and a pixel frequency are independent. Existence/nonexistence and an amount of additional data such as a depth or resolution of a pixel, a frame frequency, and audio data or digital rights management (DRM) information in a transfer stream can be freely adjusted. Transmission of uncompressed image data and dynamic range conversion definition information of the uncompressed image data is performed with the main link 1704 of the DP interface.

Also, separately from the main link 1704, in the DP interface, a half-duplex bidirectional AUX channel 1705 with a band width being 1 Mbps and the maximum delay being 500 milliseconds is included. By the bi-directional communication using the AUX channel 1705, information exchange related to a function is performed between the DP transmission device 1701 and the DP reception device 1701. By using this AUX channel 1705, it is possible to perform transmission of transmission control information (transmission request information and reception recognition information) of dynamic range conversion definition information of uncompressed image data. Also, the hot plug detection line 1706 is included to detect a change in a connection destination and can perform transmission of transmission control information (transmission request information and reception recognition information) of dynamic range conversion definition information of uncompressed image data similarly to the AUX channel 1705.

Since the DP reception device 1707 transmits transmission control information to the DP transmission device 1701 by using the AUX channel 1705 or the hot plug detection line 1706, it is possible to realize transmission control of dynamic range conversion definition information which control is similar to that illustrated in FIG. 11 or FIG. 12 in the DP system 1700.

[Data Structure Example of AUX Channel]

Figure 18:
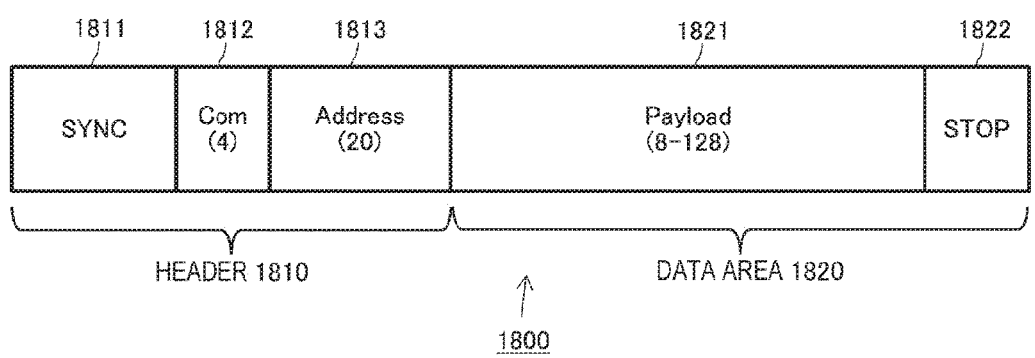
FIG. 18 is a view illustrating a structure example of a packet 1800 transmitted on an AUX channel 1705 included in the DP interface.

In FIG. 18, a structure example of a packet 1800 transmitted on the AUX channel 1705 included in the DP interface is illustrated. As illustrated in an upper part in FIG. 18, the packet 1800 includes a header 1810 and a data area 1820. The header 1810 includes an SYNC part 1811 for synchronization, a 4-bit command part (Com) 1812, and a 20-bit address of a transmission destination (address) 1813. After the header 1810, the data area 1820 is configured from a payload part (Paylaod) 1821 having eight to 128 bit lengths, and a STOP bit 1822.

Transmission control information (transmission request information and reception recognition information) of dynamic range conversion definition information is inserted into the payload part 1821 of the packet 1800. In a lower part in FIG. 18, a data structure example 1830 of transmission control information inserted into the payload part 1821 is illustrated. A seventh bit indicates that the packet 1800 is a transmission control request in a case where a bit indicating a transmission control request ("Retransmit_request") is set and a high level "1" is set. Then, each of a sixth bit to a fourth bit indicates a kind of data of a transmission control request ("Metadata_type") in a case where the high level "1" is set in the seventh bit. 0b001 indicates dynamic range conversion definition information and 0b010 indicates gamma definition information. From 0b011 to 0b111 are reserved ("Reserved") for extension in the future. A zeroth bit indicates that dynamic range conversion definition information is received in a case where a bit indicating reception recognition information ("Metadata_receipt") is set and the high level "1" is set.

[Structure Example of MHL System]

Figure 19:
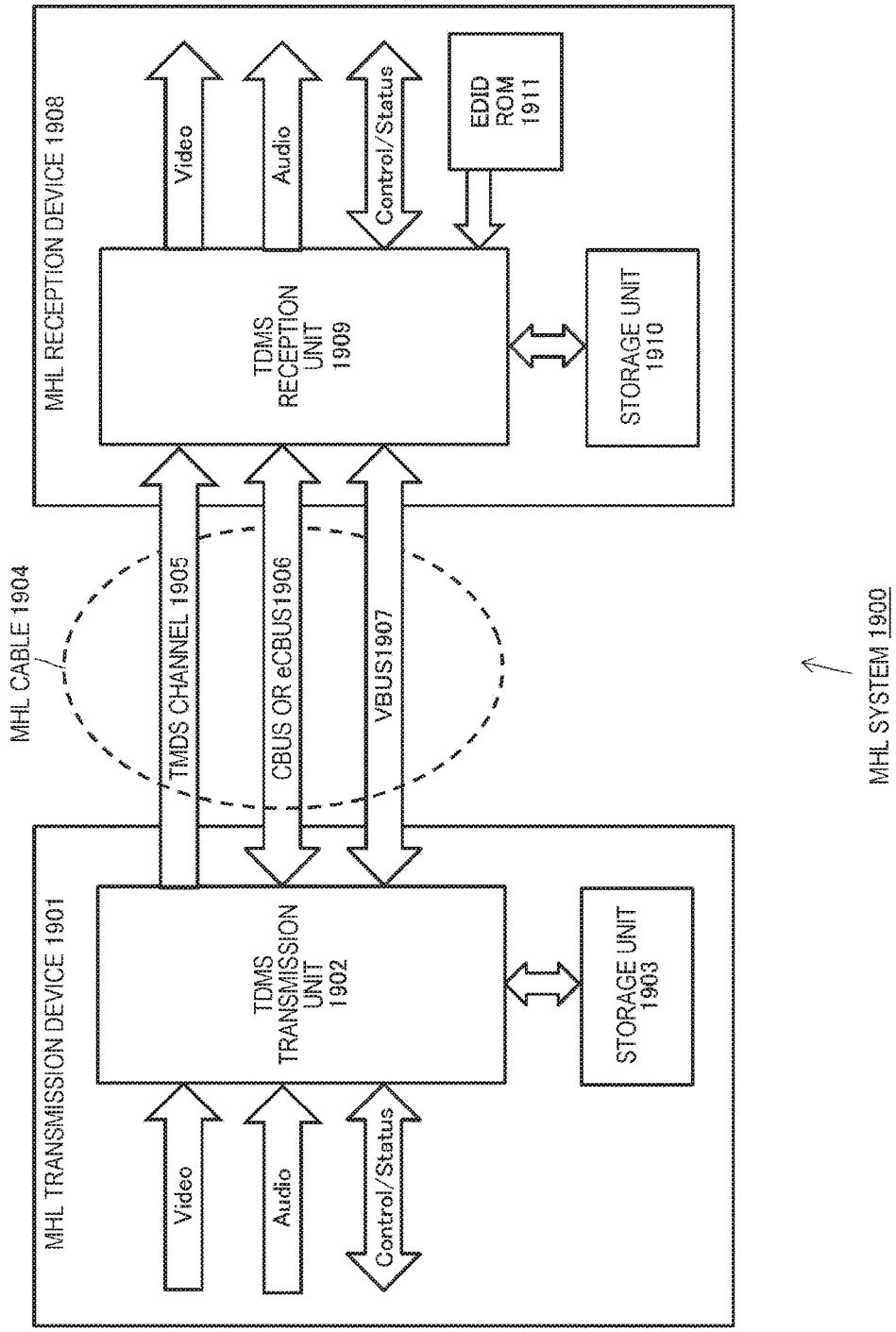
FIG. 19 is a view illustrating a configuration example of an MHL system 1900 using an MHL interface.

In FIG. 19, a configuration example of an MHL system 1900 using an MHL interface is illustrated. The illustrated MHL system 1900 includes an MHL transmission device 1901 and an MHL reception device 1908. The MHL transmission device 1901 includes a TDMS transmission unit 1902 and a storage unit 1903. Also, the MHL reception device 1908 includes a TDMS reception unit 1909, a storage unit 1910, and an EDID-ROM 1911. Then, the TDMS transmission unit 1902 and the TDMS reception unit 1909 are connected to each other by an MHL cable 1904.

The MHL cable 1904 includes a TMDS channel 1905, a CBUS line or eCBUS line 1906, and a VBUS line for supplying power 1907. The TMDS channel 1905 includes a pair of differential signal pairs and performs transmission of dynamic range conversion definition information of uncompressed image data. By using the CBUS line or eCBUS line 1906, it is possible to perform transmission of transmission control information (transmission request information and reception recognition information) of dynamic range conversion definition information of uncompressed image data.

When the MHL reception device 1908 transmits transmission control information to the MHL transmission device 1901 by using the CBUS line or eCBUS line 1906, it is possible to realize transmission control dynamic range conversion definition information similar to that illustrated in FIG. 11 or FIG. 12 in in the MHL system 1900.

[Data Structure Example of CBUS Line]

Figure 20:
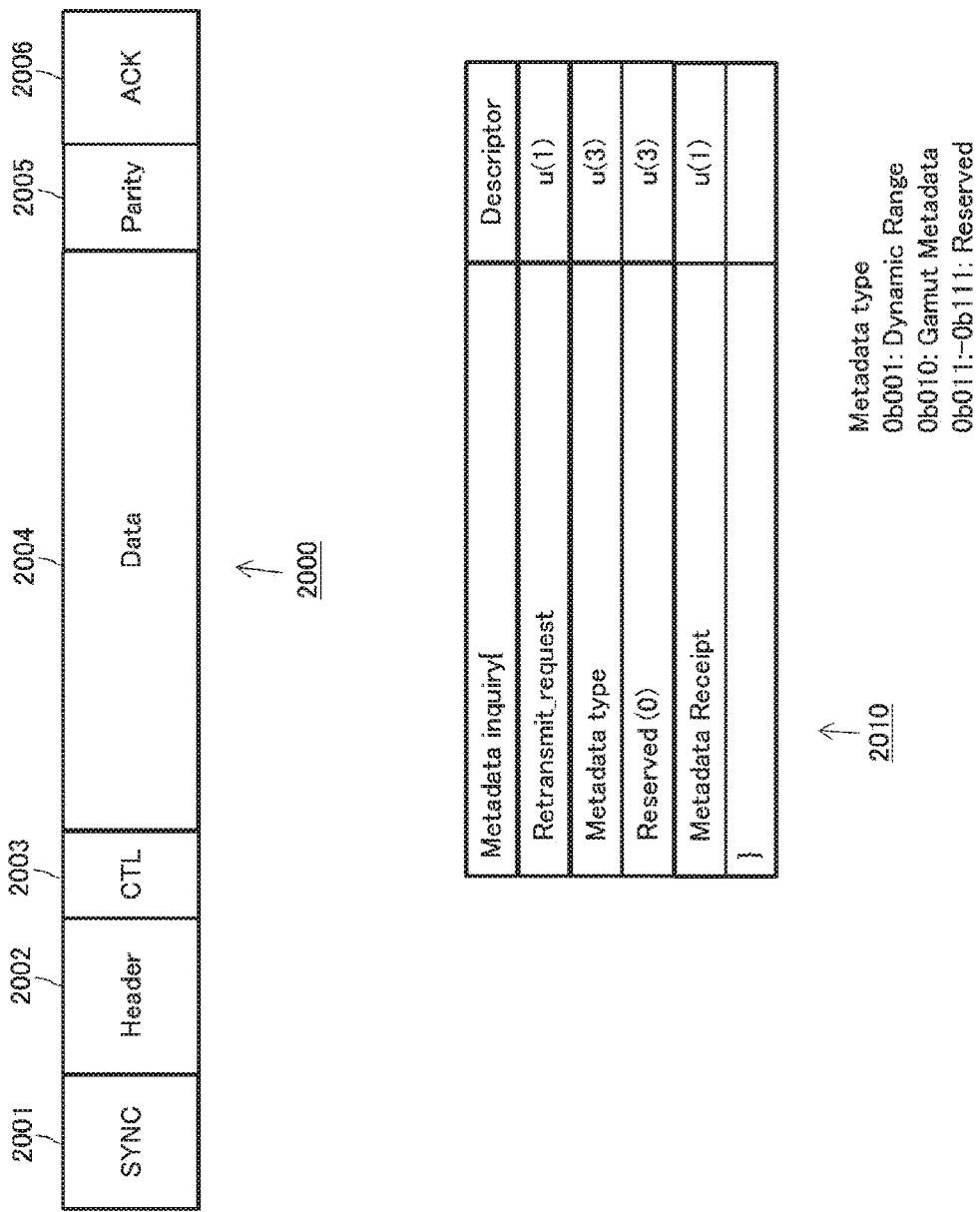
FIG. 20 is a view illustrating a structure example of a packet 20000 transmitted on a CBUS channel 1906.

In FIG. 20, a structure example of a packet 20000 transmitted on the CBUS channel 1906 is illustrated. As illustrated in an upper part in FIG. 20, a packet 2000 includes an SYNC pulse part (SYNC) 2001 of two clocks, a 2-bit header part (Header) 2002, a 1-bit control part (CTL) 2003, an 8-bit data part (Data) 2004, a 1-bit parity part (Parity) 2005, and an ACK part (ACK) 2006 of two clocks.

Transmission control information (transmission request information and reception recognition information) of dynamic range conversion definition information is inserted into the data part 2004 of the packet 2000. In a lower part in FIG. 20, a data structure example 2010 of transmission control information inserted into the data part 2004 is illustrated. A seventh bit indicates that the packet 2000 is a transmission control request in a case where a bit indicating a transmission control request ("Retransmit_request") is set and the high level "1" is set. Then, each of a sixth bit to a fourth bit indicates a kind of data of a transmission control request ("Metadata_type") in a case where the high level "1" is set in the seventh bit. 0b001 indicates dynamic range conversion definition information and 0b010 indicates gamma definition information. From 0b011 to 0b111 are reserved ("Reserved") for extension in the future. A zeroth bit indicates that dynamic range conversion definition information is received in a case where a bit indicating reception recognition information ("Metadata_receipt") is set and the high level "1" is set.

Transmission control of the dynamic range conversion definition information by the CBUS line 1906 of the MHL interface will be described in comparison with an HPD 35 line in the HDMI interface. In the CBUS line, when a data part 2004 of a packet 200 illustrated in FIG. 20 is set to 0x64, HPD indicates the high level "1." Also, when the data part 2004 is set to 0x65, HPD indicates the low level "0." Accordingly, it is possible to transmit a transmission control request by the CBUS line 1906.

CITATION LIST

Patent Document

Patent Document 1: Japanese Patent Application Laid-Open No. 2009-3882
Patent Document 2: Japanese Patent Application Laid-Open No. 2008-276067
Patent Document 3: Japanese Patent Application Laid-Open No. 2006-211095

INDUSTRIAL APPLICABILITY

In the above, a technology disclosed in the present specification has been described in detail with reference to a specific embodiment. However, it is obvious that those skilled in the art can perform modification or substitution of the embodiment within the spirit and the scope of the technology disclosed in the present specification.

In the present specification, an embodiment of an AV system using a transmission path of an HDMI (see FIG. 1) has been described. However, as baseband digital interfaces, there are a mobile high-definition link (MHL), an optical fiber interface, a digital visual interface (DVI) interface, a display port (DP) interface, a wireless interface using a 60 GHz millimeter wave, and the like other than the HDMI. A technology disclosed in the present specification can be also applied, in a similar manner, to a case of transmitting transmission control information of dynamic range conversion definition information of uncompressed image data with these digital interfaces.

That is, a technology disclosed in the present specification has been described with an example and contents described in the present specification are not to be interpreted in a limited manner. Claims are to be considered to determine the spirit of the technology disclosed in the present specification.

Note that the technology disclosed in the present specification can include the following configurations (1) to (13).

(1) A communication device including: a data transmission unit that transmits uncompressed image data to an external device through a transmission path; an information transmission unit that transmits dynamic range conversion definition information of the uncompressed image data to the external device through the transmission path; and a control reception unit that receives transmission control information of the dynamic range conversion definition information from the external device through the transmission path.

(1-1) The communication device according to (1), wherein the information transmission unit inserts the dynamic range conversion definition information of the uncompressed image data into a blanking period of the uncompressed image data, which is transmitted by the data transmission unit, and performs transmission to the external device.

(1-2) The communication device according to (1), wherein the information transmission unit transmits the dynamic range conversion definition information of the uncompressed image data to the external device through a bi-directional communication path including a predetermined line included in the transmission path.

(1-3) The communication device according to (1-2), wherein the bi-directional communication path includes a pair of differential transmission paths, and at least one in the pair of differential transmission paths has a notification function of a connection state of the external device.

(1-4) The communication device according to (1), wherein the communication path includes a pair of differential transmission paths, and at least one in the pair of differential transmission paths has a notification function of a connection state of the external device.

(2) The communication device according to (1), wherein the control reception unit receives the transmission control information from the external device through a line that receives notification of a connection state of the external device with DC bias potential of the transmission path.

(3) The communication device according to (1), wherein the control reception unit receives the transmission control information from the external device through a predetermined control data line included in the transmission path.

(4) The communication device according to (1), wherein the control reception unit receives the transmission control information from the external device through a bi-directional communication path including a predetermined line included in the transmission path.

(5) The communication device according to any one of (1) to (4), wherein transmission of the dynamic range conversion definition information from the information transmission unit to the external device is controlled on the basis of the transmission control information received in the control reception unit from the external device.

(5-1) The communication device according to (5), wherein the dynamic range conversion definition information is transmitted from the information transmission unit in response to reception of transmission request information for the dynamic range conversion definition information in the control reception unit from the external device.

(5-2) The communication device according to (5), wherein transmission of the dynamic range conversion definition information from the information transmission unit is stopped in response to reception of reception recognition information of the dynamic range conversion definition information in the control reception unit from the external device.

(6) A communication method including: a data transmitting step of transmitting uncompressed image data to an external device through a transmission path; an information transmitting step of transmitting dynamic range conversion definition information of the uncompressed image data to the external device through the transmission path; a control receiving step of receiving transmission control information of the dynamic range conversion definition information from the external device through the transmission path; and a transmission controlling step of controlling transmission of the dynamic range conversion definition information to the external device on the basis of the transmission control information received from the external device in the control receiving step.

(7) A computer program in a computer-readable format which program causes a computer to function as a data transmission unit that transmits uncompressed image data to an external device through a transmission path, an information transmission unit that transmits dynamic range conversion definition information of the uncompressed image data to the external device through the transmission path, and a control reception unit that receives transmission control information of the dynamic range conversion definition information from the external device through the transmission path.

(8) A communication device including: a data reception unit that receives uncompressed image data from an external device through a transmission path; an information reception unit that receives dynamic range conversion definition information of the uncompressed image data from the external device through the transmission path; and a control transmission unit that transmits transmission control information of the dynamic range conversion definition information to the external device through the transmission path.

(8-1) The communication device according to (8), wherein the information reception unit receives dynamic range conversion definition information inserted in a blanking period of the uncompressed image data received in the data reception unit.

(8-2) The communication device according to (8), wherein the information transmission unit receives the dynamic range conversion definition information of the uncompressed image data from the external device through a bi-directional communication path including a predetermined line included in the transmission path.

(8-3) The communication device according to (8-2), wherein the bi-directional communication path includes a pair of differential transmission paths, and at least one in the pair of differential transmission paths has a notification function of a connection state of the external device.

(8-4) The communication device according to (8), wherein the communication path includes a pair of differential transmission paths, and at least one in the pair of differential transmission paths has a notification function of a connection state of the external device.

(8-5) The communication device according to (8), wherein transmission of the transmission control information from the control transmission unit is controlled according to a reception state of the dynamic range conversion definition information in the information reception unit.

(8-6) The communication device according to (8), wherein the control transmission unit transmits transmission request information, which requests transmission of the dynamic range conversion definition information, to the external device as the transmission control information.

(8-7) The communication device according to (8), wherein the control transmission unit transmits, to the external device, transmission request information of requesting transmission of the dynamic range conversion definition information in response to switching to an input from the external device through the transmission path.

(8-8) The communication device according to (8), wherein the control transmission unit transmits, as the transmission control information, reception recognition information of the dynamic range conversion definition information to the external device.

(8-9) The communication device according to (8), wherein the control transmission unit transmits reception recognition information of the dynamic range conversion definition information to the external device in response to reception of the dynamic range conversion definition information in the information reception unit from the external device.

(9) The communication device according to (8), wherein the control transmission unit transmits the transmission control information to the external device through a line that receives notification of a connection state of the external device with DC bias potential of the transmission path.

(10) The communication device according to (8), wherein the control transmission unit transmits the transmission control information to the external device through a predetermined control data line included in the transmission path.

(11) The communication device according to (8), wherein the control transmission unit transmits the transmission control information to the external device through a bidirectional communication path including a predetermined line included in the transmission path.

(12) A communication device including: a data receiving step of receiving uncompressed image data from an external device through a transmission path; an information receiving step of receiving dynamic range conversion definition information of the uncompressed image data from the external device through the transmission path; and a control transmitting step of transmitting transmission control information of the dynamic range conversion definition information to the external device through the transmission path.

(13) A computer program in a computer readable format which program causes a computer to function as a data reception unit that receives uncompressed image data from an external device through a transmission path, an information reception unit that receives dynamic range conversion definition information of the uncompressed image data from the external device through the transmission path, and a control transmission unit that transmits transmission control information of the dynamic range conversion definition information to the external device through the transmission path.

REFERENCE SIGNS LIST

10 AV system
11 BD recorder
11a HDMI terminal
11b HDMI transmission unit
11c Control reception unit
11d Information transmission unit
11e Decoding unit
11f Storage medium
12 Set top box (STB)
12a HDMI terminal
12b HDMI transmission unit
12c Control reception unit
12d Tuner unit
12e Decoding unit
12f Information storage unit
12g Information transmission unit
13 Television receiver
13a HDMI terminal
13b HDMI reception unit
13c Control transmission unit
13d Information reception unit
13e Storage unit
13f HDMI terminal
13g HDMI reception unit
13h Control transmission unit
13i Information reception unit
13j Storage unit
13k Selection unit
13m Signal processing unit
14-1, 14-2 HDMI cable
101 CPU
102 Internal bus
103 Flash ROM
104 SDRAM
105 Remote control reception unit
106 Remote control transmitter
107 Recording medium control interface
108 BD drive
109 HDD
110 MPEG decoder
111 Graphic generation circuit
112 Image output terminal
113 Audio output terminal
114 Display control unit
115 Panel driving circuit
116 Display panel
117 Power supply unit
118 SSD
119 HDMI transmission unit
120 High-speed bus interface
201 Antenna terminal
202 Digital tuner
203 MPEG decoder
204 Image signal processing circuit
205 Graphic generation circuit
206 Panel driving circuit
207 Display panel
208 Audio signal processing circuit
209 Audio amplification circuit
210 Speaker
211 Internal bus
212 CPU
213 Flash ROM
214 SDRAM
215 Remote control reception unit
216 Remote control transmitter
217 Wireless transmission/reception unit
218 Display control unit
219 Power supply unit
220 HDMI reception unit
221 High-speed bus interface
222 HDMI reception unit
223 High-speed bus interface
1700 DP system
1701 DP transmission device
1702 DP transmission unit
1703 DP cable
1704 Main link
1705 AUX channel
1706 Hot plug detection line
1707 DP reception device
1708 DP reception unit
1900 MHL system
1901 MHL transmission device
1902 TDMS transmission unit
1903 Storage unit
1904 MHL cable
1905 TDMS channel
1906 CBUS line or eCBUS line
1907 VBUS line
1908 MHL reception device
1909 TDMS reception unit
1910 Storage unit
1911 EDID-ROM

The invention claimed is:

1. A communication device, comprising:
a data transmission unit configured to transmit uncompressed image data to an external device via a transmission path;
an information transmission unit configured to transmit dynamic range conversion definition information of the uncompressed image data to the external device at a determined timing via the transmission path; and
a control reception unit configured to receive transmission control information of the dynamic range conversion definition information from the external device via the transmission path,
wherein the determined timing of the transmission of the dynamic range conversion definition information to the external device in response to the transmission control information is based on an input switching process at the external device to switch from a first source to a second source of the uncompressed image data.

2. The communication device according to claim 1, wherein
the control reception unit is further configured to receive the transmission control information from the external device via a line, and
the line receives notification of a connection state of the external device with DC bias potential of the transmission path.

3. The communication device according to claim 1, wherein
the control reception unit is further configured to receive the transmission control information from the external device via a determined control data line, and
the determined control data line is included in the transmission path.

4. The communication device according to claim 1, wherein
the control reception unit is further configured to receive the transmission control information from the external device via a bi-directional communication path,
the bi-directional communication path includes a determined line, and
the determined line is included in the transmission path.

5. The communication device according to claim 1, wherein
the input switching process is based on a user operation to switch from the first source to the second source, and
the second source corresponds to the communication device.

6. A communication method, comprising:
transmitting uncompressed image data to an external device via a transmission path;
receiving transmission control information of dynamic range conversion definition information from the external device via the transmission path; and
transmitting the dynamic range conversion definition information of the uncompressed image data to the external device at a determined timing via the transmission path in response to the transmission control information,
wherein the determined timing of the transmission of the dynamic range conversion definition information to the external device is based on an input switching process at the external device to switch from a first source to a second source of the uncompressed image data.

7. A non-transitory computer-readable medium having stored thereon, computer-executable instructions which when executed by a processor of a communication device, cause the communication device to execute operations, the operations comprising:
transmitting uncompressed image data to an external device via a transmission path;
receiving transmission control information of dynamic range conversion definition information from the external device via the transmission path; and
transmitting the dynamic range conversion definition information of the uncompressed image data to the external device at a determined timing via the transmission path in response to the transmission control information,
wherein the determined timing of the transmission of the dynamic range conversion definition information to the external device is based on an input switching process at the external device to switch from a first source to a second source of the uncompressed image data.

8. A communication device, comprising:
a data reception unit configured to receive uncompressed image data from an external device via a transmission path;
an information reception unit configured to receive dynamic range conversion definition information of the uncompressed image data from the external device at a determined timing via the transmission path; and
a control transmission unit configured to transmit transmission control information of the dynamic range conversion definition information to the external device via the transmission path,
wherein the determined timing of the reception of the dynamic range conversion definition information from the external device is based on an input switching process at the communication device to switch from a first source to a second source of the uncompressed image data.

9. The communication device according to claim 8, wherein
the control transmission unit is further configured to transmit the transmission control information to the external device via a line, and
the line transmits notification of a connection state of the external device with DC bias potential of the transmission path.

10. The communication device according to claim 8, wherein
the control transmission unit is further configured to transmit the transmission control information to the external device via a determined control data line, and
the determined control data line is included in the transmission path.

11. The communication device according to claim 8, wherein
the control transmission unit is further configured to transmit the transmission control information to the external device via a bi-directional communication path,
the bi-directional communication path includes a determined line, and
the determined line is included in the transmission path.

12. The communication device according to claim 8, further comprising circuitry configured to execute dynamic range inverse conversion of the uncompressed image data based on the received dynamic range conversion definition information.

13. A communication method, comprising:
in a communication device:
receiving uncompressed image data from an external device via a transmission path;
transmitting transmission control information of dynamic range conversion definition information to the external device via the transmission path; and
receiving the dynamic range conversion definition information of the uncompressed image data from the external device at a determined timing via the transmission path in response to the transmission control information,
wherein the determined timing of the reception of the dynamic range conversion definition information from the external device is based on an input switching process at the communication device to switch from a first source to a second source of the uncompressed image data.

14. A non-transitory computer-readable medium having stored thereon computer-executable instructions which when executed by a processor of a communication device cause the communication device to execute operations, the operations comprising:

receiving uncompressed image data from an external device via a transmission path, transmitting transmission control information of dynamic range conversion definition information to the external device via the transmission path; and receiving the dynamic range conversion definition information of the uncompressed image data from the external device at a determined timing via the transmission path in response to the transmission control information, wherein the determined timing of the reception of the dynamic range conversion definition information from the external device is based on an input switching process at the communication device to switch from a first source to a second source of the uncompressed image data.

* * * * *